(12) United States Patent
Nobue et al.

(10) Patent No.: US 6,469,286 B1
(45) Date of Patent: Oct. 22, 2002

(54) VARIABLE-IMPEDANCE UNIT, MICROWAVE DEVICE USING THE UNIT, AND MICROWAVE HEATER

(75) Inventors: Tomotaka Nobue, Nara (JP); Akemi Fukumoto, Osaka (JP); Akira Ahagon, Osaka (JP); Tomoko Tani, Osaka (JP); Koji Yoshino, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/743,404

(22) PCT Filed: Jul. 7, 1999

(86) PCT No.: PCT/JP99/03661

§ 371 (c)(1),
(2), (4) Date: Mar. 8, 2001

(87) PCT Pub. No.: WO00/03564

PCT Pub. Date: Jan. 20, 2000

(30) Foreign Application Priority Data

Nov. 13, 1997 (JP) .............................................. 9-311752
Jul. 8, 1998 (JP) ........................................... 10-192535
Oct. 8, 1998 (JP) ........................................... 10-286253

(51) Int. Cl.$^7$ .............................. H05B 6/68; H05B 6/74
(52) U.S. Cl. ....................... 219/746; 219/750; 219/747; 219/751; 333/231
(58) Field of Search ................................ 219/750, 745, 219/747, 751, 690, 696, 695; 333/159, 209, 224, 225, 226, 232, 233

(56) References Cited

U.S. PATENT DOCUMENTS 3,622,921 A * 11/1971 Heeren ....................... 333/21 A
4,234,775 A * 11/1980 Wolfberg et al. ............ 219/692
4,613,836 A * 9/1986 Evans ......................... 333/159
5,410,283 A * 4/1995 Gooray et al. ............... 333/159
6,114,677 A * 9/2000 Idomoto et al. ............. 219/750

FOREIGN PATENT DOCUMENTS

| EP | 788296 | 8/1997 |
| JP | 51-31382 | 3/1976 |
| JP | 53-40428 | 4/1978 |
| JP | 55-88289 | 7/1980 |
| JP | S61-294789 | 12/1986 |
| JP | 3-31034 | 2/1991 |

(List continued on next page.)

OTHER PUBLICATIONS

International Search Report dated Oct. 19, 1999, application No. PCT/JP99/03661.

*Primary Examiner*—Philip H. Leung
(74) *Attorney, Agent, or Firm*—RatnerPrestia

(57) ABSTRACT

A compact and highly controllable impedance-varying-unit, a microwave device using the same unit, and a high-frequency-heating appliance using the same unit are provided. The impedance varying unit includes a rectangular waveguide-section as a main body made of metallic material, an open end of waveguide-section working on microwave in a microwave cavity, a terminal end of waveguide-section closed by metallic material, a rotary movable body made of non-metallic material, and a driver for the movable body. A rotating angle or a position of the movable body is controlled, so that an impedance at the open end is varied and transmission status of microwave is changed, thereby variably controlling a standing wave distribution. Controlling the standing wave distribution allows an object in the cavity to be selectively heated or uniformly heated. Further, the standing wave produced in the microwave cavity is sequentially varied, so that the object can be selectively heated or uniformly heated. The present invention solves the problem of spark production, and provides a compact as well as highly controllable impedance varying unit, a microwave device using the same unit and a high-frequency-heating appliance using the same unit.

29 Claims, 28 Drawing Sheets

FOREIGN PATENT DOCUMENTS

| | | |
|---|---|---|
| JP | 05-074566 | 3/1993 |
| JP | 07122356 | 5/1995 |
| JP | 08124672 | 5/1996 |
| JP | 08195277 | 7/1996 |
| JP | 08330066 | 12/1996 |
| JP | 09022775 | 1/1997 |
| JP | 09159180 | 6/1997 |
| JP | 11144861 | 5/1999 |

* cited by examiner

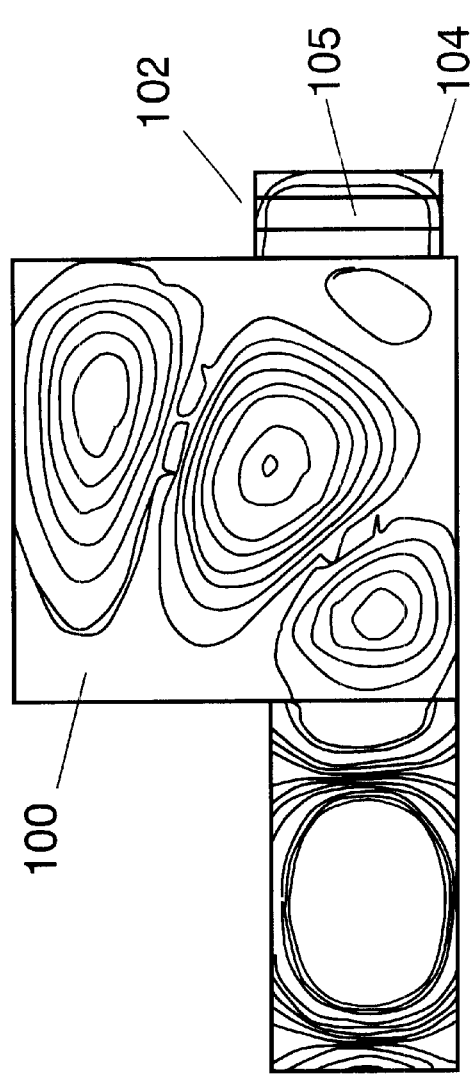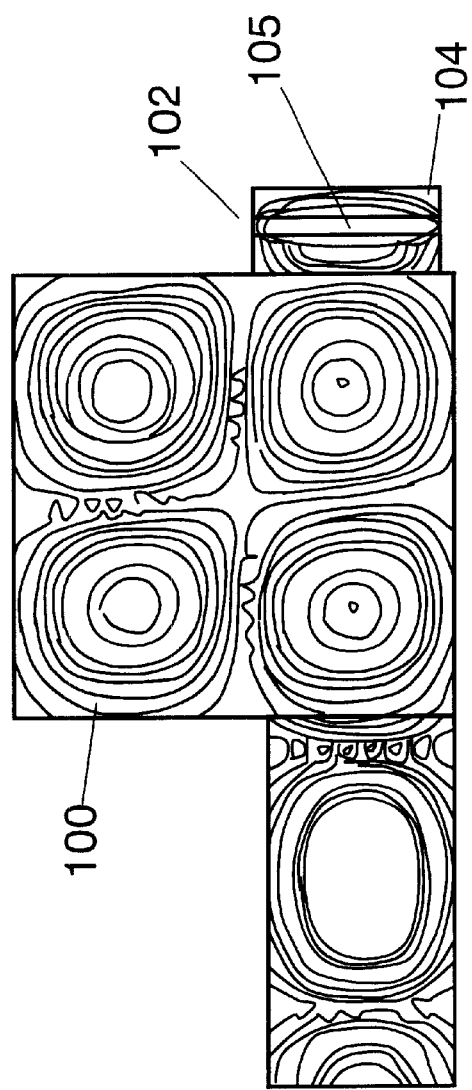
FIG. 11A
FIG. 11B

VARIABLE-IMPEDANCE UNIT, MICROWAVE DEVICE USING THE UNIT, AND MICROWAVE HEATER

This application is a U.S. National Phase Application of PCT International Application PCT/JP99/03661.

TECHNICAL FIELD

The present invention relates to an impedance varying unit which is built in a microwave cavity entrapping microwave or built in a waveguide which propagates microwave. The unit works on the microwave distributed throughout the structure of the cavity or the waveguide to change the propagation details of the wave. The present invention also relates to a microwave device as well as a high frequency heating appliance both using this impedance varying unit.

BACKGROUND ART

One of the methods to change the propagation details of the microwave traveling through a conventional waveguide is to place a metal member in a traveling path of the microwave in the waveguide, so that capacitive component or inductive component as impedance is added in the waveguide. For instance, the metal member is inserted from H plane (wide wall) in roughly parallel to E plane (narrow wall) to produce capacitive component within the waveguide, so that transmission characteristics of the microwave travelling the waveguide are changed.

In this waveguide, the metal member is movable with respect to metal walls constituting the waveguide. Some creative ideas and a given clearance are provided between the movable metal member and the walls of the waveguide in order to eliminate spark-occurrence therebetween. Regarding the clearance, an electric-wave-shielding-mechanism is provided in order to prevent the leakage of an electric wave from the clearance. Accordingly, the conventional waveguide requires a complicated and a large size construction due to this movable metal member.

There is another method for changing the transmission details of the microwave in the microwave cavity. For instance, the location of supplying section of the microwave to the microwave cavity is changed, or a method of coupling (magnetic field coupling or electric field coupling) with the microwave cavity is changed, so that standing-wave-distribution produced in the microwave cavity is changed.

In the microwave cavity explained above, when a distribution of the standing wave is changed, it is necessary to change physically the location of the supplying section or the coupling method. As a result, it is difficult to change the distribution of standing wave in time sequence.

Further, in a high frequency heating appliance, so called "mode stirrer" is available, which spins metal blades to reflect diffusely microwave in the microwave cavity where an object to be heated is placed. The mode stirrer reflects the microwave incident upon the blades in every direction, and it is difficult to reflect the wave into a specific area. Therefore, it is difficult to selectively provide inducible heat to a specific area of the object.

Still further, in a high frequency heating appliance, "mode turntable" is available, which rotates the object to be heated on a table in the microwave cavity. The mode turntable is to promote uniform heating by moving the object per se to the standing wave distribution produced in the microwave cavity, and a degree of the heating uniformity depends on the distribution of standing wave. This "mode turntable" does not positively change the distribution of the standing wave.

Japanese Patent Laid-Open Publication No. H08-330066 discloses a high frequency heating appliance, in which the direction of high frequency current running on the wall of the microwave cavity is varied, so that an exciting mode produced in the microwave cavity can be changed. This technique uses a plate on which a plurality of openings are arranged, and the plate is disposed on roughly the same plane as the microwave cavity wall, and the plate is driven to spin. Spinning the plate changes the direction of a longitudinal axis, thereby changing the direction of the high-frequency-current running on the microwave-cavity-wall, which also changes an exciting mode in the cavity. This intends to select an exciting mode adequate to the object to be heated, and to result in a heating distribution fit for the object.

However, this technique is formed by rotating an opening, and it is necessary to prevent the production of spark entailed by the spin of the metal member in the microwave cavity. This requires a spark preventive mechanism and makes the construction complicated. A longitudinal length of the opening must be more than a half of the wavelength of the microwave radiated in the cavity, so that a space necessary for rotating the opening occupies a large area on the wall where the opening is disposed. In the construction discussed above, exciting modes available in the cavity are limited due to the influence of the opening or the clearance for preventing the spark. This makes it difficult to obtain a heating distribution fit for the object.

DISCLOSURE OF THE INVENTION

The present invention addresses the problems discussed above, and aims to deal with the problem of spark occurrence and provide a compact size and controllable impedance-varying-unit. The impedance varying unit is mounted on a wall defining a microwave cavity, and the unit controls as well as varies the impedance of the wall, so that standing wave distribution produced in the microwave cavity can be varied in time-sequence. This is done by a microwave device of the present invention. The present invention also provides a high frequency heating appliance using this microwave device, and the appliance can selectively heat an object or realize uniform heating.

The impedance varying unit of the present invention comprises the following elements:

a waveguide section of which first end is terminated and a second end is opened; and a movable body disposed within the waveguide section. The movable body is driven and controlled, so that impedance at an open end of the waveguide section can be varied. For that purpose, the operating face of the unit is coupled to an arbitrary boundary of the cavity, so that leakage of electric wave from the operating face is eliminated.

A transmission mode TEn0 is used in the waveguide section ("n" is a positive integer), so that the impedance varying unit of the present invention can uniform the effect of incident microwave to the movable body and make the effect independent of "n". As a result, design change such as enlarging the operating face can be done with ease.

Further, the movable body rotates on a rotary shaft defining the space to the terminal end of the waveguide section, so that the movable space of the movable body can be limited to a smaller space. As a result, the unit in a compact size can vary and control the impedance at the open end.

Still further, the movable body can be moved by changing the space to the terminal end of the waveguide section, so that a variable range of the impedance at the open end can be widened.

Yet further, the movable body is made of non-metallic material, so that a breakdown voltage between the body and the waveguide section can be raised. As a result, reliability of the unit against an input of high powered microwave can be guaranteed.

Further, when the impedance at the open end is zero (0), the open end works in the same manner as a metal wall, so that characteristic comparison with a case where the impedance varying unit is not used can be checked with ease.

At the open end, a phase difference between an incident wave to the waveguide section and a reflective wave therefrom becomes zero (0) so that effect of the microwave at the open end can be maximized.

Further, the impedance at the open end forms impedance of inductive component and capacitive component with zero centering in between. Thus the unit can be utilized for matching adjustment.

Still further, in the impedance varying unit of the present invention, a position detector detects a position of the movable body, so that the effect of the microwave at the open end can be positively controlled based on a signal of the position detector. Based on a signal from a microwave detector, the position of the movable body is determined, so that the microwave detector also works as a position detector for the movable body. As a result, other position detectors can be eliminated.

The impedance varying unit of the present invention detects the standing wave distribution in the waveguide section, so that an operation status of the unit can be determined and the reliability of the operation can be guaranteed.

The impedance varying unit of the present invention includes a stepping motor which drives the movable body, so that a stay time at each step can be arbitrarily controlled. As a result, various combinations of impedance including time factor can be controlled.

The impedance varying unit in a flat shape can be integrated into the microwave device even when a length of the waveguide section is long because the terminal end and the open end form approx. right angles.

A plurality of the movable bodies are disposed in the waveguide section and driven, and journal (rotatably supporting) angles of the bodies are variously combined, so that a variable range of the impedance at the open end can be largely varied. As a result, the effect of the microwave can be maximized.

The microwave device of the present invention comprises the following elements:

a microwave cavity practically entrapping microwave fed;

an opening disposed on metal wall forming the cavity; and the impedance varying unit.

In the cavity, various distributions of standing wave are formed responsive to impedance at the opening.

Further, the microwave device of the present invention comprises the following elements:

a microwave cavity in a shape of approx. rectangular hexahedron practically entrapping microwave fed;

an opening provided on at least one plane of the rectangular; and the impedance varying unit for varying the impedance at the opening.

The impedance at the opening on the wall of the cavity is changed, so that node and antinode of the standing wave distribution produced in the cavity move linearly.

The microwave device of the present invention can produce multiplexed transmission of microwave or various distributions of standing wave within the cavity by providing the opening as well as the impedance varying unit coupled to the opening.

In the microwave cavity having a plurality of exciting modes, a plurality of openings are disposed so that high-frequency-currents flowing on a wall of the cavity independently and separately flows. The impedance of each opening thus varies, this mechanism allows a desirable single exciting mode to be produced in the microwave cavity.

A high frequency heating appliance comprises the following elements:

the microwave cavity accommodating an object to be heated;

a high frequency generator for radiating microwave into the cavity;

a controller for controlling the impedance varying unit included in the cavity based on heating information of the object, and the high frequency generator.

This construction allows the impedance at the opening or the energy of the microwave generated by the high frequency generator to be controlled, so that a specific area of the object can be selectively heated or the entire object can be uniformly heated.

Further, the high frequency heating appliance of the present invention has a turntable which rotates the object to be heated in the microwave cavity. Controlling the impedance varying unit as well as a table driver controls the distribution of standing wave and the rotation of the object in the cavity. Thus the entire object is heated further uniformly.

The high frequency heating appliance of the present invention controls the impedance varying unit, so that the standing-wave-distribution in the cavity can be varied in time-sequence. This mechanism allows an object difficult for being rotated to be heated uniformly.

The high frequency heating appliance of the present invention automatically controls to provide an optimum heating distribution to the object, so that convenience of the appliance is enhanced.

Further, the high frequency heating appliance of the present invention can increase a varying speed of the impedance varied by the impedance varying unit. As a result, diffusive reflection of microwave in the cavity is promoted, which promotes uniform heating of the object in vertical direction.

In the high frequency heating appliance of the present invention, a user can select and input one of heating methods of the object, namely heating methods including "defrost", "re-heating", "oven-heating", and "keep warm." There are several types of information difficult to be detected by the high frequency heating appliance: they are types of the objects, shapes of the objects, a number of the objects, and a method of heating, i.e. one of defrost, re-heating, oven-heating, and keeping warm. Since the method of heating can be selected and input by a user, the controller recognizes the object roughly dividing into two types, one is a specific area of the object is to be selectively heated, the other is the entire object is to be uniformly heated.

To be more specific, regarding the types of the objects, moisture content of the object is one of references. For instance, the controller recognizes the object having more than 60% of moisture content as requiring overall heating, and controls the impedance varying unit accordingly. Regarding the shapes of the objects, the controller recognizes a flat object as requiring overall heating. Regarding the number of the objects, the controller recognizes a plurality of objects as requiring overall heating. When the "defrost" is input, the controller recognizes the object as requiring overall heating advantageously over other input information. This mechanism realizes the heating desired by a user.

In the high frequency heating appliance of the present invention, the heating information can be obtained as physical information from the high frequency heating appliance or the object to be heated during the heating.

In order to obtain this physical information, the appliance includes detectors corresponding to the physical information. The physical information obtained from the appliance is an intensity signal of electromagnetic field within the microwave cavity or the impedance varying unit. On the other hand, the physical information obtained from the object is at least one of, e.g. weight, present temperature of the object, and density of gas produced from the object.

The physical information discussed above is used for determining details of controlling to be carried out by the controller during the heating.

In other words, intensity information of electromagnetic field is used as heating-control-information for the object difficult to detect its temperature, or for avoiding idle-heating when no object exists. The weight information of the object is used for controlling the heating or determining an end of the heating by detecting a degree of dryness of the object. Temperature information is used for variable control of the impedance at the opening based on the present temperature of the object, or for variable control of microwave power supplied from the high frequency generator, or for detecting an end of heating the object. The density information of gas produced from the object is used for, e.g., in the case of vapor, when the vapor amount reaches a given level, the heating should be finished.

The various information discussed above is used, so that at least one of the impedance varying unit, the table driver and the high frequency generator can be automatically controlled by a signal from the controller, or manually controlled with a manually input signal. Thus the object can be heated selectively or entirely as a user desires.

As explained above, the present invention solves the problem of the spark occurrence, and also provides the highly controllable impedance-varying-unit in a compact body, the microwave device using the unit and the high-frequency-heating-appliance using the unit. When these unit, device and appliance are used, the distribution of standing-wave produced in the microwave cavity can be varied in time-sequence, and the object can be selectively or uniformly heated.

BRIEF DESCRIPTION OF THE DRAWINGS

FIG. 8 shows an impedance varying unit in accordance with a third exemplary embodiment of the present invention.

FIG. 9 shows an impedance varying unit in accordance with a fourth exemplary embodiment of the present invention.

FIG. 11 shows characteristics of distribution of electric field produced in a microwave cavity when the impedance varying unit shown in FIG. 10 is controlled. FIG. 11A shows a distribution of electric field when the movable body is supported at 90 degree. FIG. 11B shows a distribution of electric field when the movable body is supported at 0 (zero) degree.

DESCRIPTION OF THE PREFERRED EMBODIMENT

First Exemplary Embodiment

Figure 1:
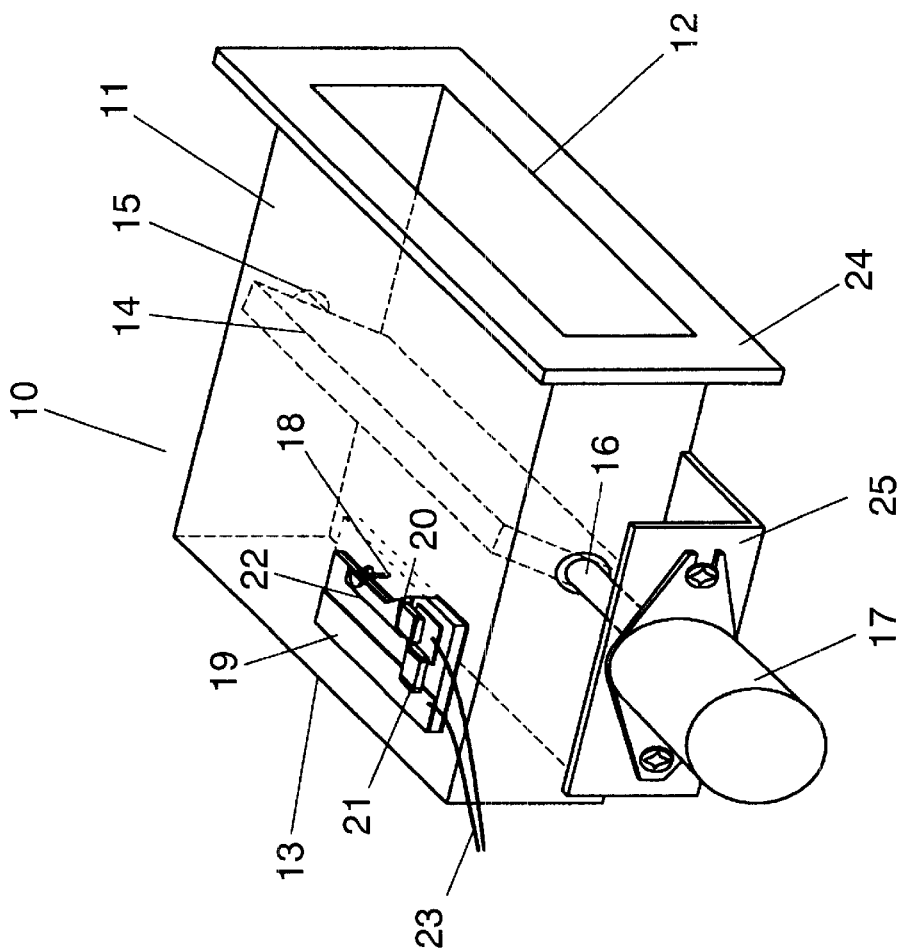
FIG. 1 is a perspective view of an impedance varying unit in accordance with a first exemplary embodiment of the present invention.

FIG. 1 shows an appearance of an impedance varying unit in accordance with the first exemplary embodiment. In FIG. 1, impedance varying unit 10 comprises a rectangular waveguide section 10 made of metallic material as a main body. A first end of waveguide section 11 forms rectangular open end 12 for guiding microwave, and terminal end 13 of waveguide 11 is closed with metallic material in order to reflect the microwave propagating through waveguide section 11. Waveguide section 11 includes plate-like movable body 14 made of non-metallic material. Movable body 14 has rotary shafts 15, 16 on both the end for rotating thereof. The rotary shafts 15, 16 are inserted into the holes of walls of waveguide section 11 and rotatably supported. Shaft 16 is linked to an output shaft of stepping motor 17 that drives movable body 14.

Movable body 14 is basically made of non metallic material such as resin or inorganic materials which has over 200☐ heat-proof temperature and features low dielectric loss at microwave band. This basic material is formed into a plate having a given thickness by molding or sintering. Movable body 14 is placed at a given distance from terminal end 13 of waveguide section 14.

Microwave detector 18 detects electromagnetic field intensity in waveguide section 11, which is a conductive core wire of coaxial cable extends through a hole punched on a wall of waveguide section 11 into waveguide section 11 as an antenna. Detector circuit 19 detects a microwave signal detected by microwave detector 18, and forms a plane circuit comprising detector diode 20, chip capacitor 21. An end of the core wire of microwave detector 18 is coupled to micro-strip line pattern 22. The microwave signal detected by microwave detector 18 is output as a voltage signal via detector circuit 19 and lead wire 23. Impedance varying unit 10 is mounted to a microwave device with mounting flange 24. Stepping motor 17 is held with support plate 25.

The flow of microwave propagation in waveguide section 11 and the effect of movable body 14 are described with reference to FIG. 2.

Waveguide section 11 propagates TE10 mode wave and its cross section is parallel to H plane (longitudinal face of rectangular waveguide-section.) The space between movable body 14 and the wall of waveguide section is omitted in the drawing.

Figure 2:
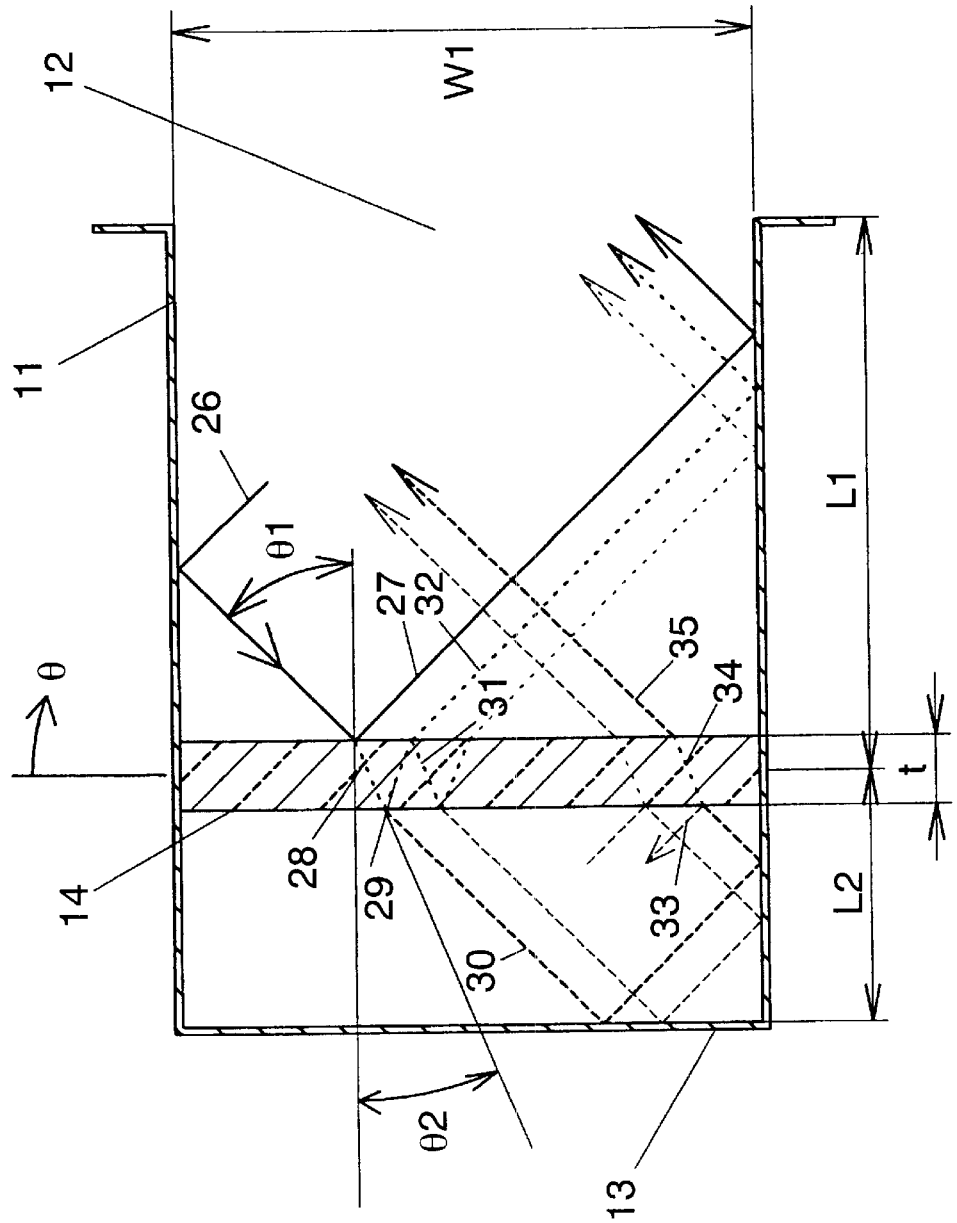
FIG. 2 illustrates microwave transmission in the impedance varying unit shown in FIG. 1.

In FIG. 2, the propagation of microwave, incident into waveguide 11 from open end 12, is described by a method of combining two plane waves in the microwave engineering field. FIG. 2 illustrates the traveling direction of the plane waves. Microwave 26 in waveguide section 11 reflects on E plane (short-axial-face of the rectangular waveguide section), and propagates toward terminal end 13. Incident angle "$\Theta 1$" into movable body 14 is determined by width "W1" of open end 12. When propagation mode is TE10, width W1 is 80 mm, and a frequency of microwave to be transmitted is 2450 MHz, incident angle $\Theta 1$ is approx. 40.1 degree.

The microwave incident into movable body 14 made of non-metallic material splits into reflection wave 27 and transmission wave 28 on the surface of movable body 14. This reflection wave 27 is referred to as first reflection. Transmission wave 28 travels in movable body 14 and splits into reflection wave 29 and transmission wave 30 again on another surface of movable body 14. Reflection wave 29 travels in movable body 14 and splits into reflection wave 31 and transmission wave 32 on the surface of movable body. This transmission wave 32 is referred to as second reflection.

Transmission wave 30 passing through movable body 14 reflects on terminal 13 and E plane of waveguide section 11, then enters into movable body 14 again, and it splits into reflection wave 33 and transmission wave 34. Transmission wave 34 travels in movable body 14, and splits into reflection wave and transmission wave (not shown) 35 on the surface. This transmission wave 35 is referred to as "reflection after pass-through".

The dimensions of this mechanism, which is used in the later description, is this: L1=length between open end 12 and the center of movable body 14;

L2=length between the center of movable body 14 and terminal end 13; and t=plate thickness of movable body 14.

Next, the microwave energy owned by the reflection wave and the transmission wave is described. In order to simplify the description, the microwave loss based on inductive-loss-characteristics of movable body 14 made of non-metallic material is neglected. Dielectric constant in free space=1, effective dielectric constant at the microwave frequency used by movable body 14=∈.

Voltage reflection coefficient $\Gamma$ at a layer face of movable body 14 is expressed with the following equation 1:

$$\Gamma = \{\sin(\Theta_2 - \Theta_1)\} / \{\sin(\Theta_2 + \Theta_1)\} \quad \text{Equation 1}$$

$$\Theta_2 = \sin^{-1} / \sqrt{\varepsilon}$$

where $\Theta_2$=transmission angle of the transmission wave

When incident wave has energy P (Watts), the first reflection wave has energy P1, the second reflection energy has energy P2, and reflection wave after pass-through has energy P3, the microwave energy owned by the respective waves are expressed with the equation 2.

$$P1 = P\Gamma^2 \quad \text{Equation 2}$$
$$P2 = P\Gamma^2 (1 - \Gamma^2)^2 (1 + \Gamma^4 + \Gamma^8 + ...)$$
$$P3 = P(1 - \Gamma^2)^4 (1 + \Gamma^2 + \Gamma^4 + ...)(1 + \Gamma^4 + \Gamma^8 + ...)$$

Figure 3:
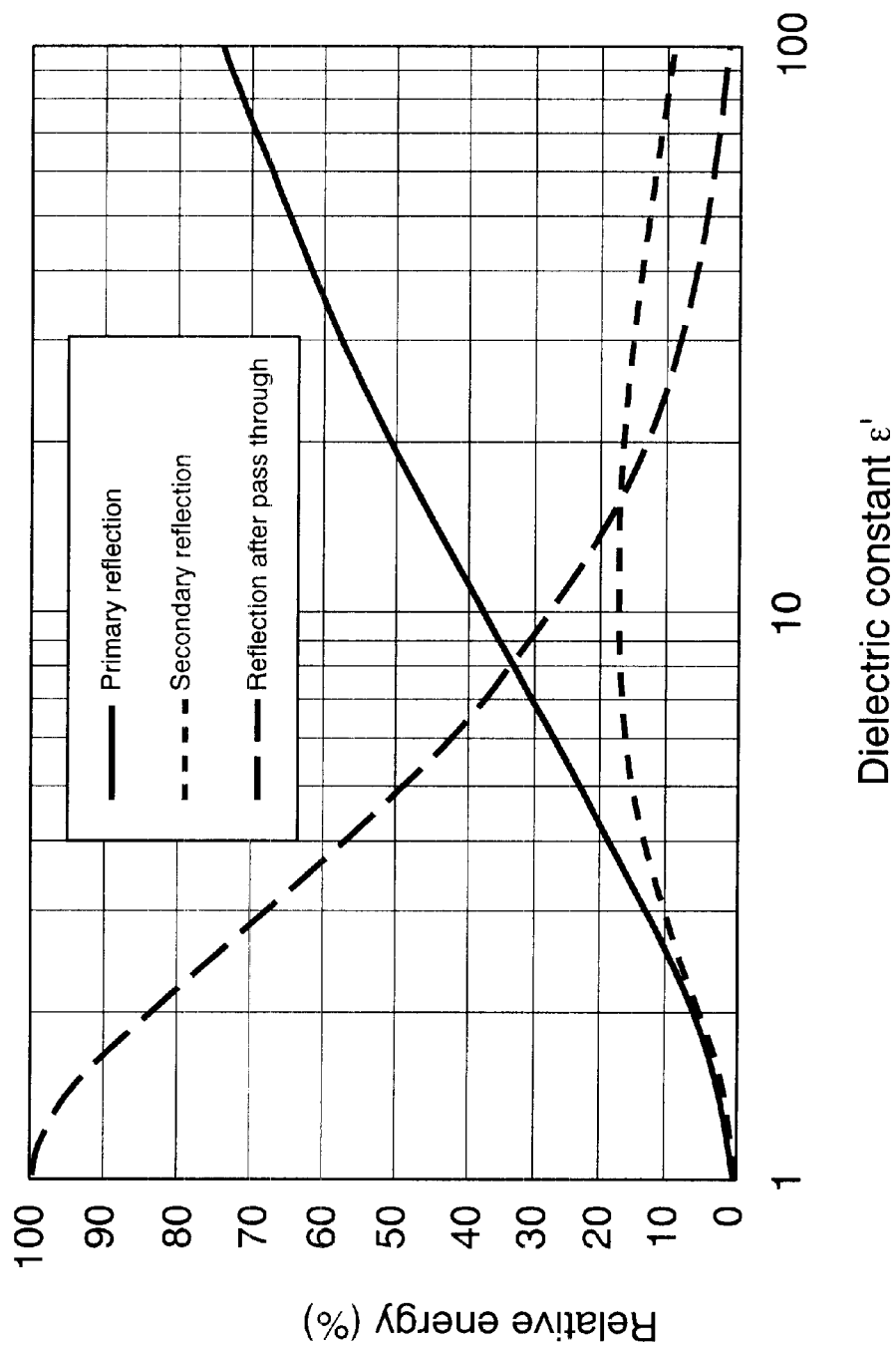
FIG. 3 shows characteristics of microwave effect to a movable body made of non-metallic material, used in the impedance varying unit of the present invention.

Energy amounts of each reflection wave are calculated using Equation 2, and the result is shown in FIG. 3. Incident angle $\Theta 1$ is 40.1 degree in FIG. 3. Effective dielectric constant=1 (one) corresponds to the case where no movable body 14 exists. In this case, only the reflection after pass-through occurs. Placing movable body 14 produces the first reflection, and greater effective dielectric constant ∈ of movable body 14 increases microwave energy owned by the first reflection and decreases microwave energy owned by the reflection after pass-through. In the case of incident angle being 40.1 degree, the effective dielectric constant is selected at approx. 8.5, so that the microwave energies owned by both the first reflection and the reflection after pass-through become equivalent. These matters are illustrated in FIG. 3.

Figure 4:
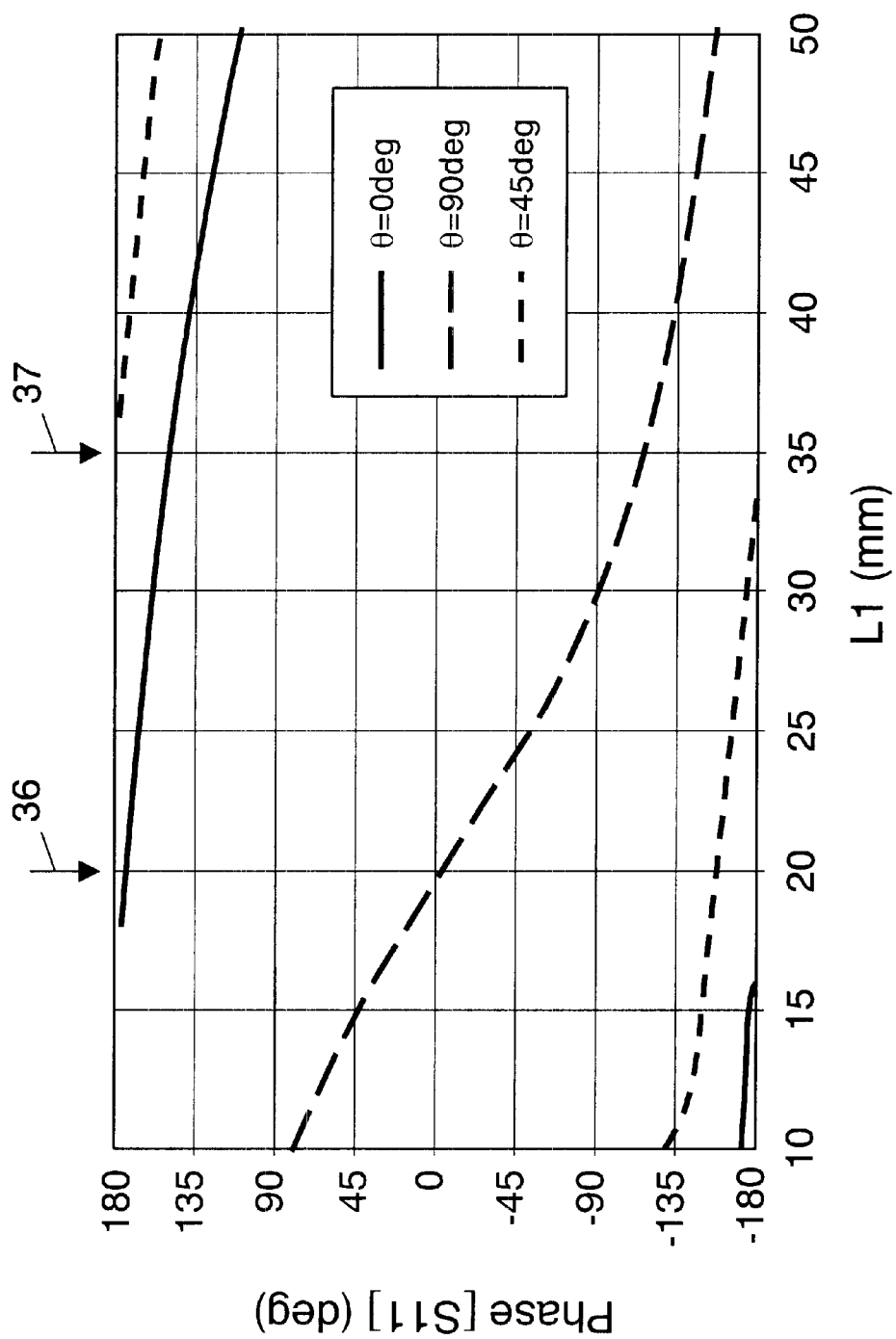
FIG. 4 shows phase characteristics of a voltage reflection coefficient at an open end of a waveguide section in accordance with an exemplary embodiment shown in FIG. 2.

FIG. 4 shows the characteristics of the impedance varying unit of the present invention. To be more specific, it shows a voltage reflection coefficient at the open end. The impedance varying unit has the following mechanical dimensions: the open end has a longitudinal width W1=80 mm, short axis=30 mm, and L2=20 mm. Movable body 14 has dielectric constant=12.3, t=6.2 mm, and width and length of the plate are 28 mm, 78 mm.

In the impedance varying unit explained above, characteristics of phase values of voltage reflection coefficient S11 at open end 12 with respect to the change of L1 are shown in FIG. 4. The rotating angle Θ of movable body 14 is expressed as shown in FIG. 2 with the reference of movable body 14 being parallel to terminal end 13. In other words, Θ=0 degree shows movable body is in the status shown in FIG. 2, and Θ=90 degree shows movable body 14 is vertical to terminal end.

In FIG. 4, a structure at arrow mark 36, i.e., L1=20 mm, allows the phase value of voltage reflection coefficient S11 at open end of waveguide section 11 to vary ±180 degree. A structure at arrow mark 37, i.e., L1=35 mm, makes the phase value of S11 at open end approx. 0 (zero) when Θ is 45 degrees, and inductive component (phase value range: +180 degree to approx. +150 degree) together with capacitive component (phase value range: −180 degree to approx. −115 degree) can be present at open end 12 by rotating movable body 14.

Forming an impedance varying unit, which includes characteristics indicated by arrow mark 36, makes the phase value of voltage reflection coefficient at the open end ±180 degree, thus the impedance at the open end can be 0 (zero), so that the open end works as same as the metal wall. Thanks to this mechanism, characteristics can be compared easily between "with the impedance varying unit" and "without the impedance varying unit." Further, this unit structure allows to vary the phase value of the voltage reflection coefficient at the open end such that including 0 degree and ±180 degrees, so that the phase value maximizes the variable width. As a result, entire effect by varying the impedance can be confirmed with ease as well as effective and wide range effect can be realized.

On the other hand, forming the impedance varying unit having the characteristics indicated by arrow mark 37 allows an impedance including inductive component and capacitive component to be formed at the open end by rotating movable body 14.

Figure 5:
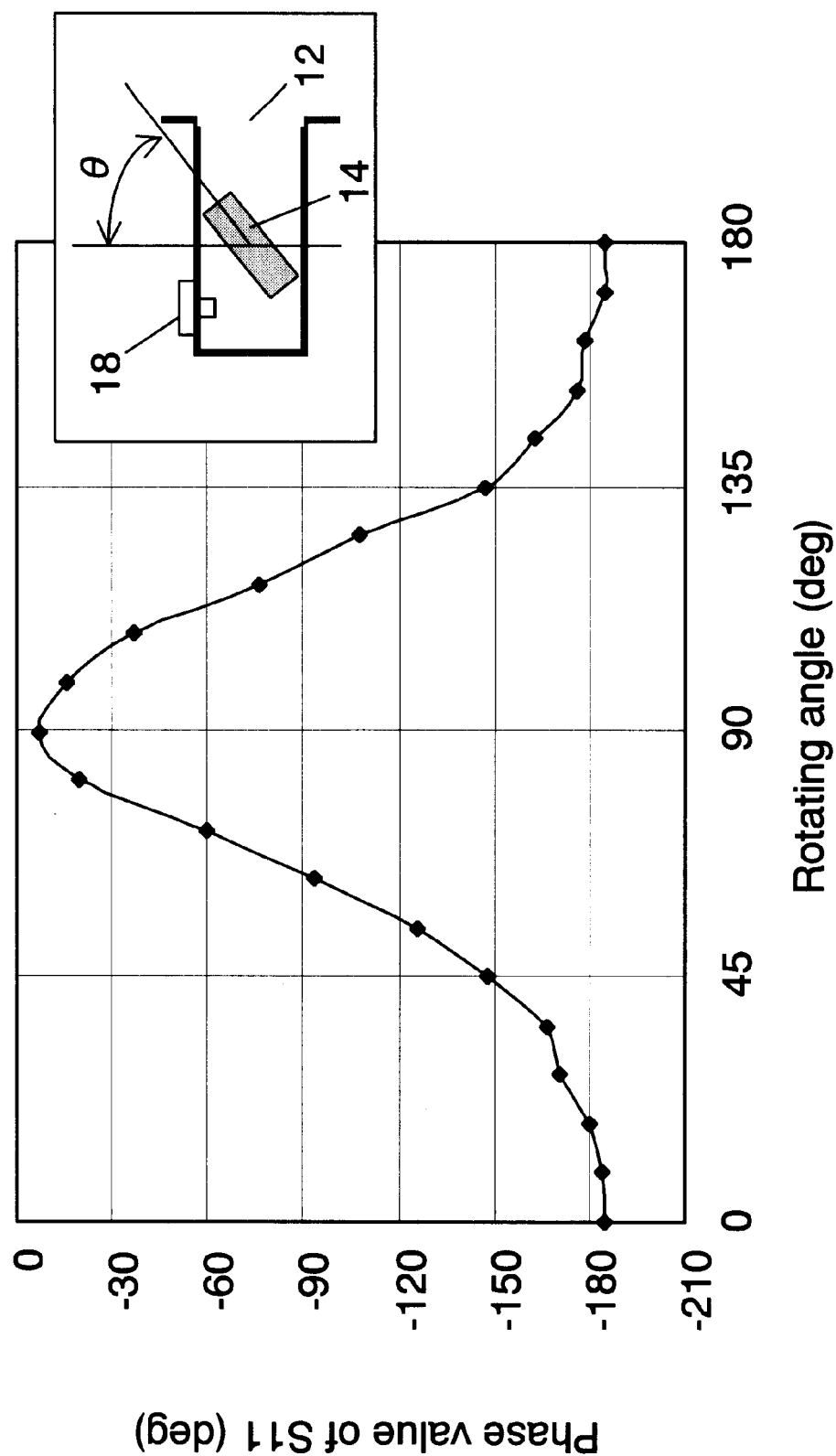
FIG. 5 shows phase characteristics of a voltage reflection coefficient at an open end of the waveguide with respect to a rotating angle of the movable body in accordance with the embodiment shown in FIG. 2.

FIG. 5 shows a characteristic of the phase value of S11 with respect to a rotating angle of movable body 14 in the impedance varying unit that has characteristics indicated by arrow mark 36.

The rotating angle of movable body 14 rotates by 9 degrees at one step of stepping motor 17. The rotating angle is shown in FIG. 5.

According to the characteristics shown in FIG. 5, when the rotating angle of movable body 14 is close to 0 degree or 180 degrees, the phase difference between an incident wave and a reflection wave at open end 12 is 180 degrees, and open end 12 functions as the metal wall. On the other hand, when the rotating angle is 90 degree, the phase difference is approx. 0 (zero). As such, varying the rotating angle of movable body 14 varies the impedance at open end 12, so that the phase difference between the incident wave and the reflection wave can be varied. This variation of the phase difference with respect to a microwave device including this impedance varying unit changes the distribution of standing wave of microwave in the microwave cavity. Further, in a high-frequency-heating appliance, described later, variable control on a heating area of an object can be realized by using the phase difference between the incident wave and reflection wave. Using this phase-difference-variable-control, a user can specify a desirable heating area at high-frequency-heating to an object. The simple construction with rotating the movable body allows the heating appliance to eliminate spark during microwave-heating, and change the distribution of standing wave quickly, so that heat in progress can be finely controlled.

Figure 6:
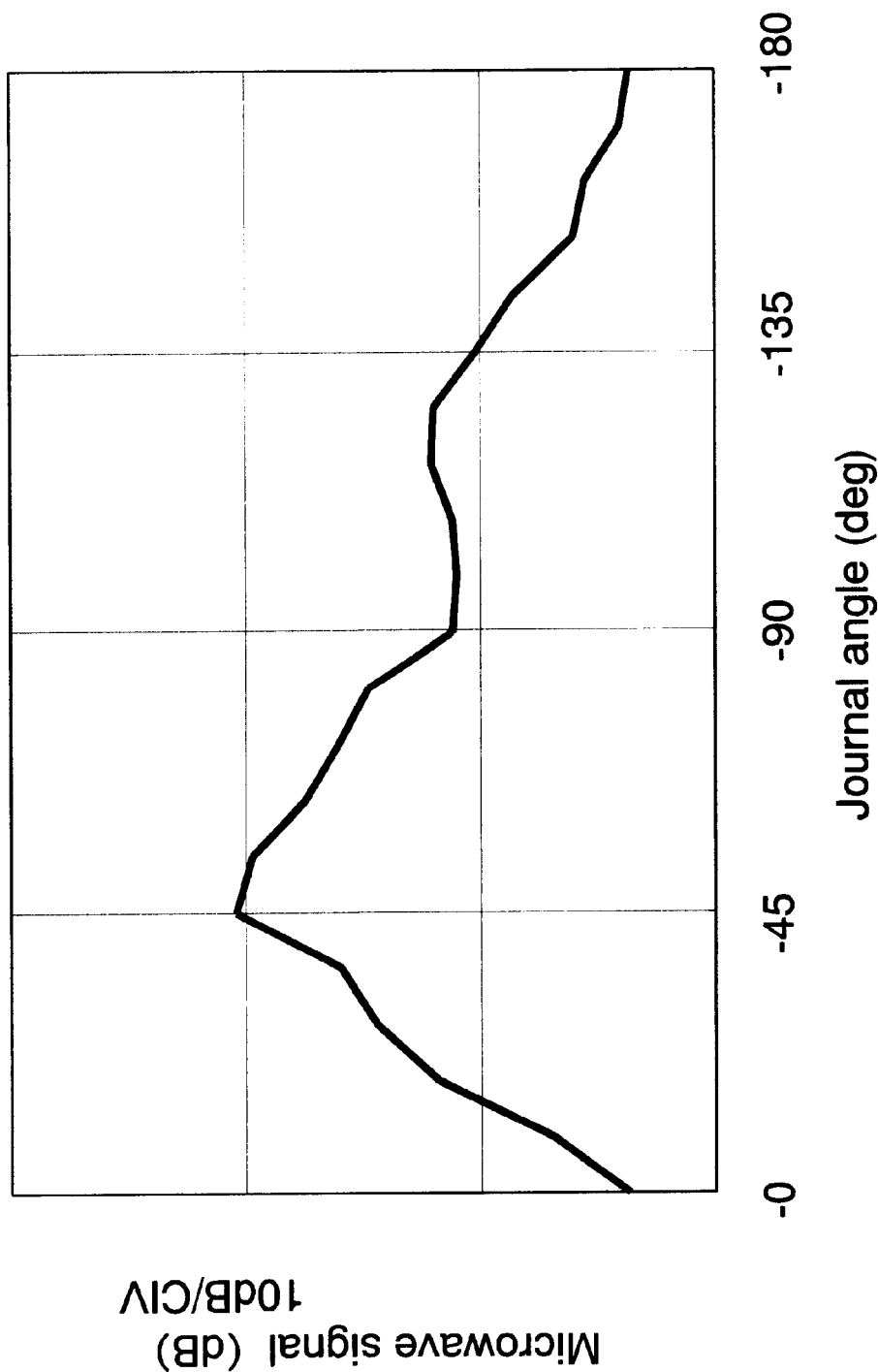
FIG. 6 shows characteristics of a signal detected by a microwave detector.

FIG. 6 shows a characteristic of a signal detected by microwave detector 18 with respect to a rotating angle of movable body 14.

The rotating angle of movable body 14 can be determined using this characteristic. Rotating angle of −45 degrees, where movable body 14 is closest to microwave detector 18, maximizes the intensity of electric field of the microwave existing in a space between a wall of waveguide section 11 and movable body 14. FIG. 6 illustrates this situation. In other words, when movable body rotates 360 degrees, the signal detected by detector 18 takes a maximum value when the rotating angle is close to −45 degree, then the rotating angle can be determined in the reversal way.

Determining the rotating angle based on the microwave signal in the waveguide section also can monitor an irregular matter in the characteristics of the entire impedance varying unit including movable body 14. Thus determining the rotating angle also determines whether there is an irregular matter or not, which eliminates a dedicated angle detector. As a result, this mechanism saves a factor for increasing cost as well as a factor for guaranteeing the reliability of the dedicated detector.

Second Exemplary Embodiment

An impedance varying unit in accordance with the second embodiment is described with reference to FIG. 7. The second embodiment differs from the first one in the construction that a space between a movable body and a terminal end can be varied.

Figure 7:
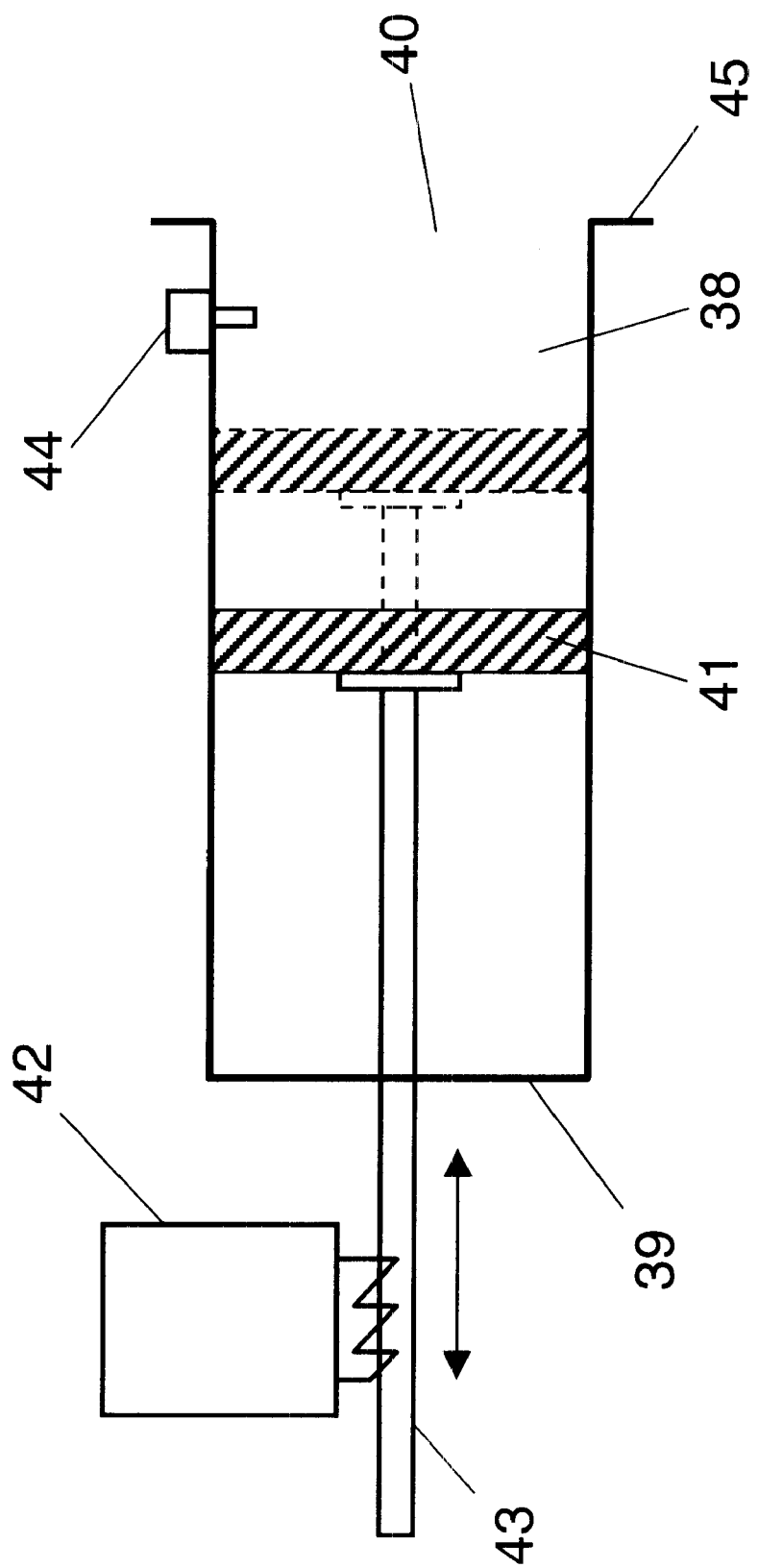
FIG. 7 is a cross section of an impedance varying unit in accordance with a second exemplary embodiment of the present invention.

In FIG. 7, the impedance varying unit comprises the following elements:

waveguide section 38;

terminal end 39 of waveguide section 38;

open end 40 of waveguide section 38;

movable body 41;

motor 42 for moving movable body 41 in parallel to terminal end 39;

rotary shaft 43 for rotating movable body 41;

microwave detector 44; and flange 45 for mounting the impedance varying unit.

The rotary shaft 43 is engaged with output shaft of motor 42 via gear.

In the structure explained above, when movable body 41 made of non-metallic material is used, it is desirable that the material of greater dielectric constant is used for movable body 41. For instance, as shown in FIG. 3, dielectric constant 100 is selected, so that the first reflection on the surface of movable body 41 has microwave energy of more than 70%. In this case, it is preferable to use dielectric material having dielectric constant less than 4 as material for rotary shaft 43 in order to minimize influence to microwave transmission within the waveguide section.

In a case when an opening of the open end of the unit is made small, so that less microwave energy is led into the waveguide, movable body 41 made of metallic material can be used. In this case, the terminal end with respect to the microwave traveling in waveguide section 38 is a surface of movable body 41. Even if movable body 41 is made of such metallic material, waveguide section 38 has a closed construction except open end 40 because of terminal end 39 originally owned by waveguide section 38. Therefore, preventive measures against microwave leakage is not needed.

The structure that varies a space between movable body 41 and terminal end 39 of waveguide section 38 can be effective for make the impedance varying unit compact with ease when the impedance at open end 40 is limited to dielectric component.

Third Exemplary Embodiment

An impedance varying unit in accordance with the third embodiment is explained with reference to FIG. 8. The third embodiment differs from the first one in a structure of enlarging a microwave effective area at an open end.

Figure 8A:
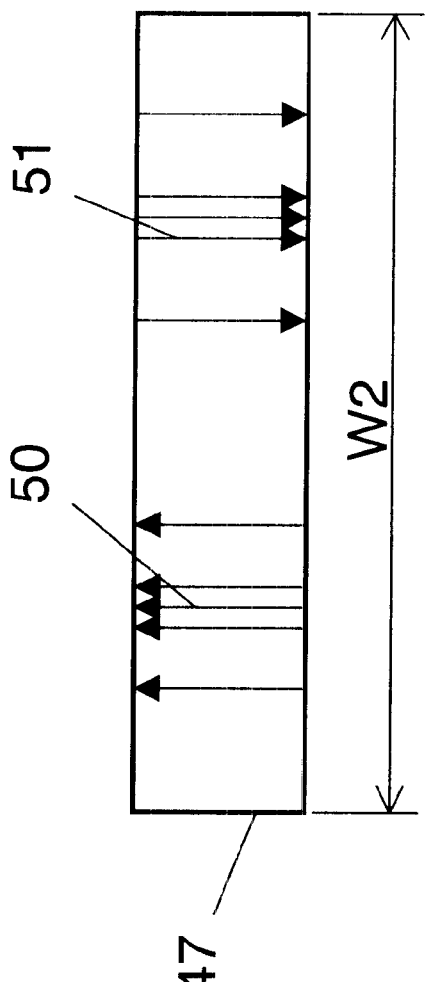
FIG. 8A is a cross sectional view thereof.
Figure 8B:
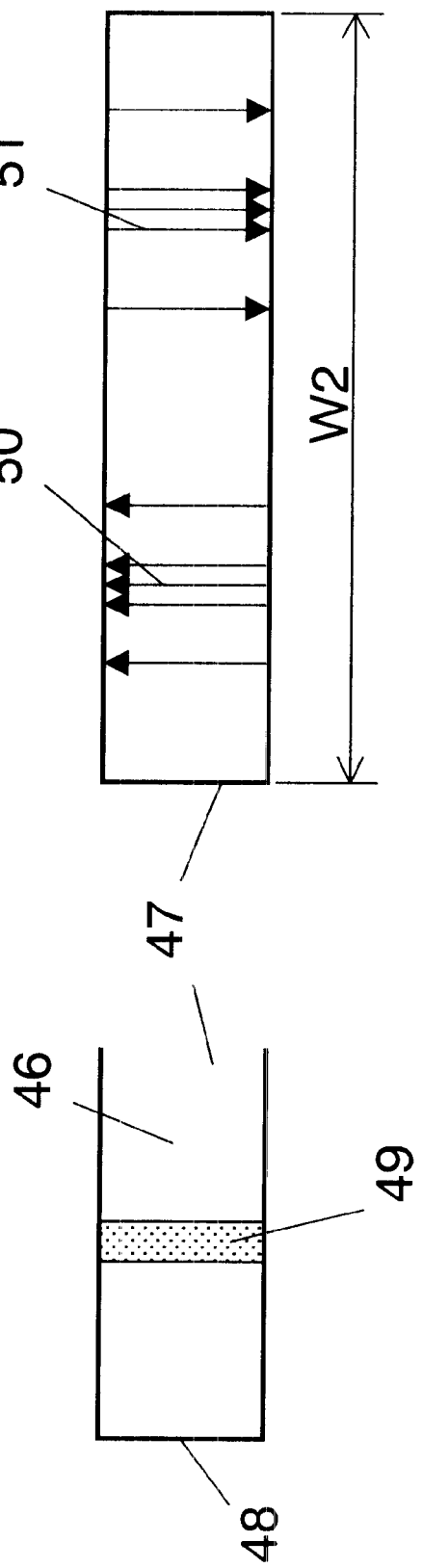
FIG. 8B shows a transmission mode of a waveguide section viewed from an open end.

FIG. 8A is a cross section of the impedance varying unit in accordance with the third embodiment, and FIG. 8B shows a propagation mode in a waveguide section viewed from the open end.

In FIG. 8A, the impedance varying unit comprises the following elements:

waveguide section 46;
open end 47 of waveguide section 46;
terminal end 48 of waveguide section 46; and
movable body 49 to be driven to rotate.

Waveguide section 46 has a longitudinal axial length W2 at its opening, and W2 is as approx. twice long as that of the first embodiment. In waveguide section 46, TE20 mode is transmitted. As shown in FIG. 8B, electric power lines marked with 50, 51 are produced in waveguide section 46 when inside of waveguide section 46 is viewed from open end 47.

As such, the shape of the open end becomes larger, so that an effective area of the impedance varying unit can be enlarged. Due to this enlargement, when the unit is mounted to a high-frequency-heating appliance described later, heating distribution can be changed with respect to the wider shape and the greater volume of an object.

TEn0 mode (n: a positive integer) is the most effective for propagation in the waveguide section. In other words, when this mode is used, a plate thickness of the movable body can be kept the same in any modes, and impedance at the open end can be changed to a given value based on a rotating angle of the movable body.

Fourth Exemplary Embodiment

An impedance varying unit in accordance with the fourth embodiment is explained hereinafter with reference to FIG. 9. The fourth embodiment differs from the first or the third ones in the structure where a plurality of rotatably movable bodies are provided in a waveguide section.

Figures 9A, 9B:
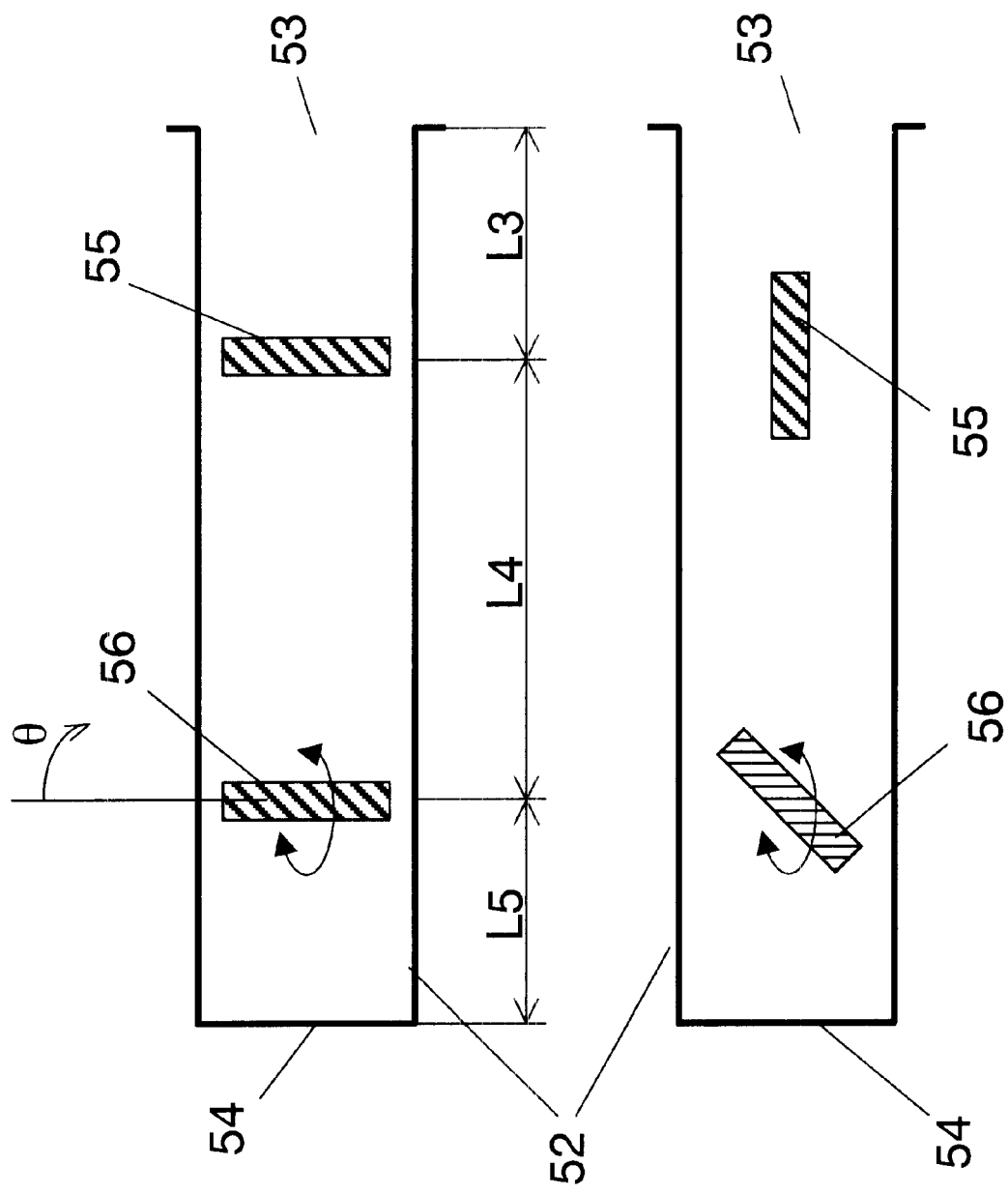
FIG. 9A shows a structure of a first control example.
FIG. 9B shows a structure of a second control example.

FIG. 9A and FIG. 9B show examples of respective rotary controls of two rotatably movable bodies equipped in an impedance varying unit. In FIG. 9, the impedance varying unit comprises the following elements:

waveguide section 52;
open end 53 of waveguide section 52;
terminal end 54 of waveguide section 52; and
rotatably movable bodies 55, 56 of the same shape.

Based on the dielectric constant of material used for movable bodies 55, 56 and the plate thickness of the movable body, distance L3 from the open end to the movable body, distance L4 between respective movable bodies, and distance L5 between the movable body and the terminal 54 are specified. Respective movable bodies 55, 56 can be independently rotary controlled.

For instance, when distance L3 between movable body 55 and open end 53 is 20 mm, distance L4 between respective movable bodies is 40 mm, distance L5 between movable body 56 and terminal end 54 is 20 mm, the width and height of the open end are 80 mm and 30 mm, and the shape as well as the specification of the movable bodies are the same as those in the first embodiment, the characteristics is demonstrated as follows: As shown in FIG. 9A, when only movable body 56 is rotary controlled, rotating angle Θ of movable body 56 is set at 45 or 136 degrees, so that impedance varying unit having two movable bodies can be set at resonance condition. In other words, as shown in FIG. 9A, only movable body 56 is rotary controlled, whereby the impedance varying unit can be utilized as a resonance element or a matching element.

Fifth Exemplary Embodiment

A microwave device using the impedance varying unit of the present invention is explained hereinafter.

Figure 10:
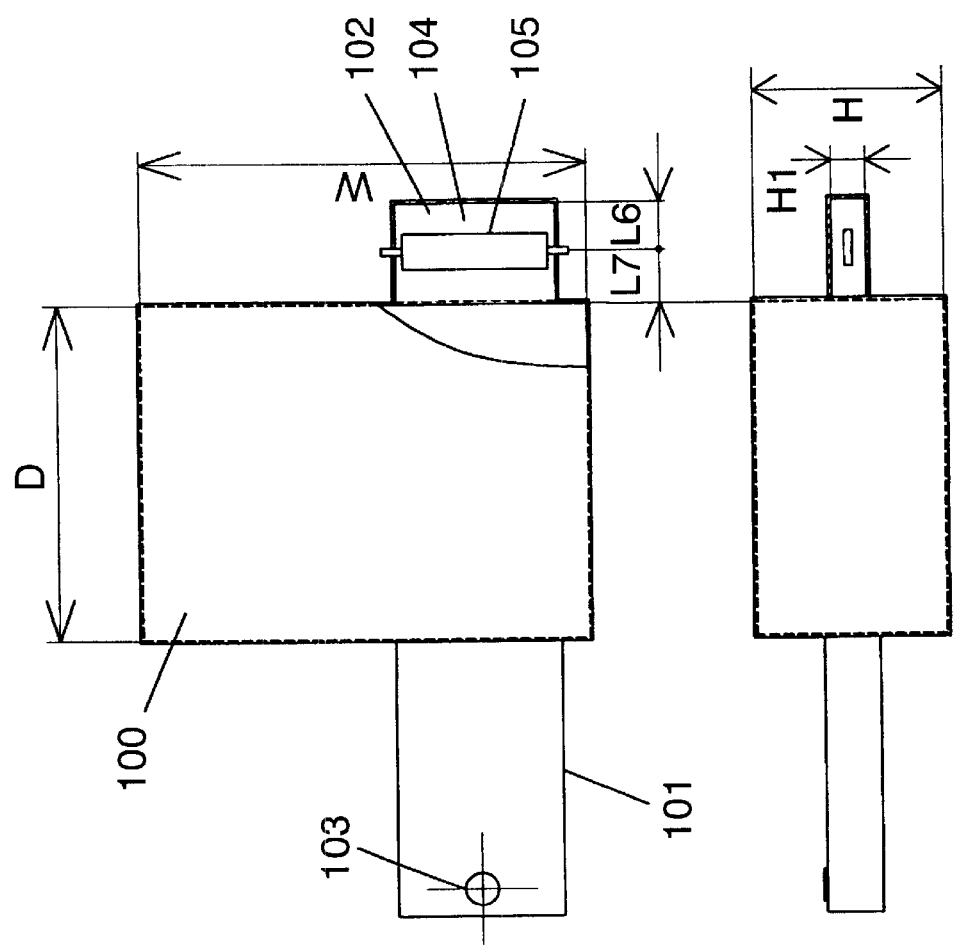
FIG. 10 shows a structure of a microwave device in accordance with a fifth exemplary embodiment of the present invention.

FIG. 10 shows a structure of the microwave device in accordance with the fifth embodiment of the present invention. In FIG. 10, the microwave device comprises the following elements:

a microwave cavity 100;
waveguide 101 for feeding microwave to microwave cavity 100;
impedance varying unit 102;
coupling hole 103 for a magnetron, a high frequency wave generator, with waveguide 101;
waveguide section 104; and
movable body 105.

The microwave device with the impedance varying unit is evaluated in order to clarify the effect of using the impedance varying unit. The evaluation is detailed hereinafter.

Microwave cavity 100 has dimensions of width W=190 mm, depth D=158 mm and height H=100 mm. This structure allows the microwave cavity 100 without impedance varying unit 102 to have electromagnetic field distribution at a 2450 MHz band having a number of peaks of standing wave in width, depth and height directions 2, 2, 0 (hereinafter described as <2 2 0>). Impedance varying unit 102 comes with waveguide section 104 having the open end of which dimensions are 15 mm×80 mm, where 15 mm corresponds to H1 in FIG. 10, and has movable body 105 having dielectric constant of 12.3, with a plate of 13 mm×78 mm in dimension and a thickness of 6.2 mm. Placement of the movable body in the waveguide section 104 results in L6=13 mm, L7=16.5 mm as shown in FIG. 10.

FIG. 11 shows computer-analyzed electromagnetic-field-distribution of the microwave device shown above. FIGS. 11A and 11B show the characteristics of respective cases where movable body 105 is vertical (Θ=90 degrees) to the terminal end of waveguide section 104, and is parallel (Θ=0 degree) thereto. According to the characteristics of FIG. 11B, when movable body 105 takes Θ=0 degree, impedance at the open end of the impedance varying unit becomes almost zero (0) and functions as a metal wall, and the electromagnetic field distribution is as same as the initial status, i.e., <2 2 0>. On the other hand, as shown in FIG. 11A, when movable body 105 takes Θ=90 degrees, and the impedance at the open end is set at an extremely large value, then the electromagnetic field distribution greatly changes. In particular, when the impedance at the open end takes the extremely large value, a high intensity of electric field appears in the center of the cavity.

In other words, when the impedance varying unit of the present invention is mounted to the microwave device, the standing wave distribution in the microwave cavity can be changed by varying the impedance at the open end of the unit which effects the microwave in the cavity. Further, a high-frequency-heating appliance, described later, utilizing such a microwave device can vary a heating area on an object to be heated.

Sixth Exemplary Embodiment

Another embodiment of the microwave device is demonstrated.

Figure 12:
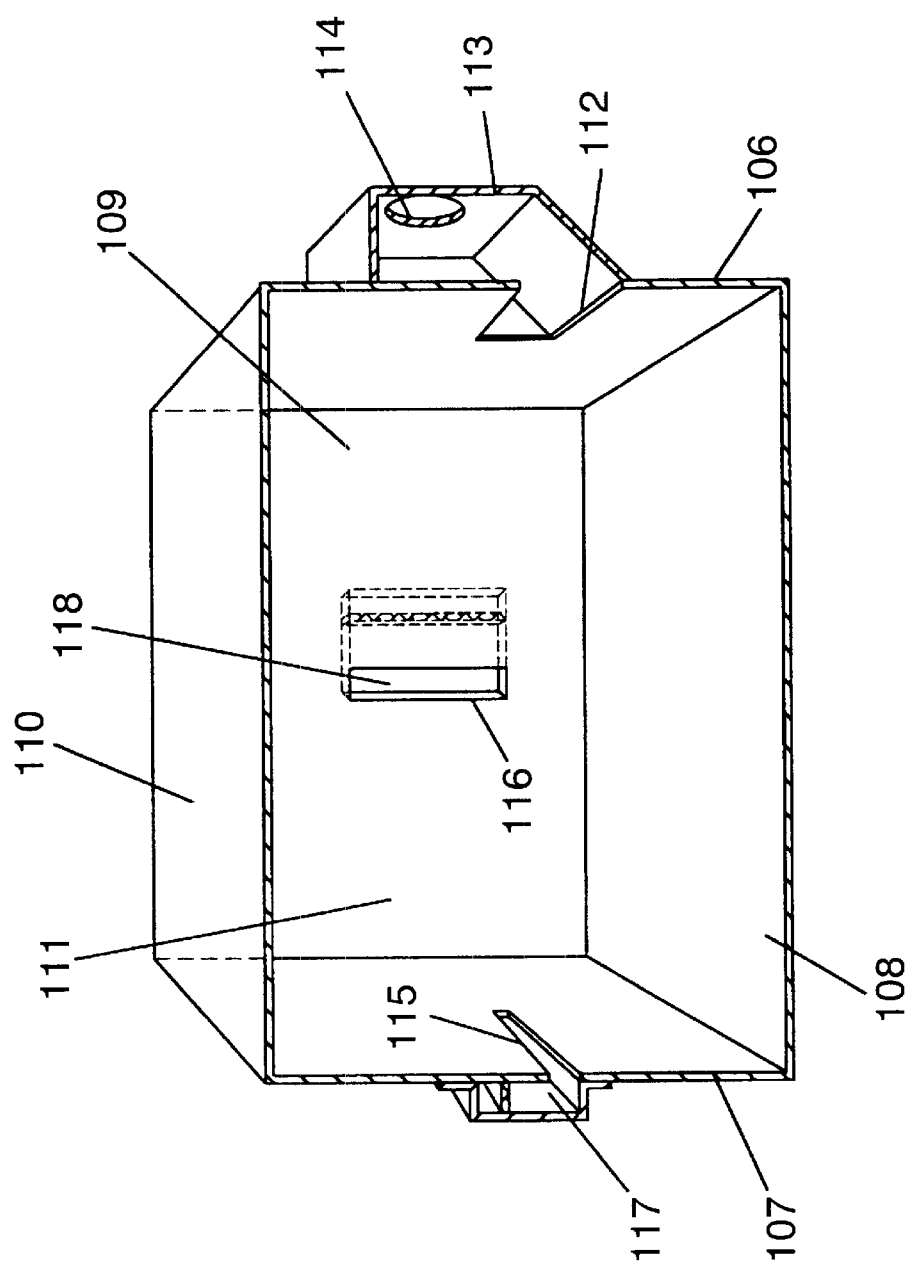
FIG. 12 is a cross section of a microwave device in accordance with a sixth exemplary embodiment of the present invention.

FIG. 12 is a cross sectional view of the microwave device in accordance with the sixth embodiment of the present invention. In FIG. 12, right wall 106, left wall 107, bottom wall 108, end wall 109 and upper wall 110 are metal walls forming microwave cavity 111.

Microwave outlet 112 is provided on right wall 106, and waveguide 113 for transmitting the microwave is coupled to outlet 112. Coupling hole 114 is provided at one end of waveguide 113, and an output antenna of a high-frequency-wave generator (not shown) is inserted in coupling hole 114.

On left wall 107 facing right wall 106, approx. rectangular opening 115 running on substantially the center of the wall is provided, and the same opening 116 also provided on the end wall 109. Outside of the cavity 111, impedance varying units 117, 118, each having an aforementioned function, are coupled to the openings 115, 116. Placement orientation of opening 115, 116 are different, and opening 115 is formed horizontally while opening 116 is formed vertically.

This structure such as providing openings with different orientations on a plurality of walls allows any one of openings to cut off a high-frequency-current. This high-frequency-current propagates on the cavity walls corresponding to various standing waves produced in microwave cavity 111. Impedance of a plurality of openings are variably controlled, so that the flow of microwave reflected on the plurality of walls are changed and various standing waves are formed in the microwave cavity. A high-frequency-heating appliance described later using this microwave device can heat an object more effectively and uniformly by variably controlling the distribution of standing waves.

As shown in FIG. 12, the open end (i.e. the opening) and the terminal end is to form approx. right angles, so that the impedance varying unit can be mounted on the wall of the cavity in a flat manner. As a result, the impedance varying unit can be mounted to the wall with saving a space.

Seventh Exemplary Embodiment

A high-frequency-heating appliance using the impedance varying unit of the present invention is explained hereinafter.

Figure 13:
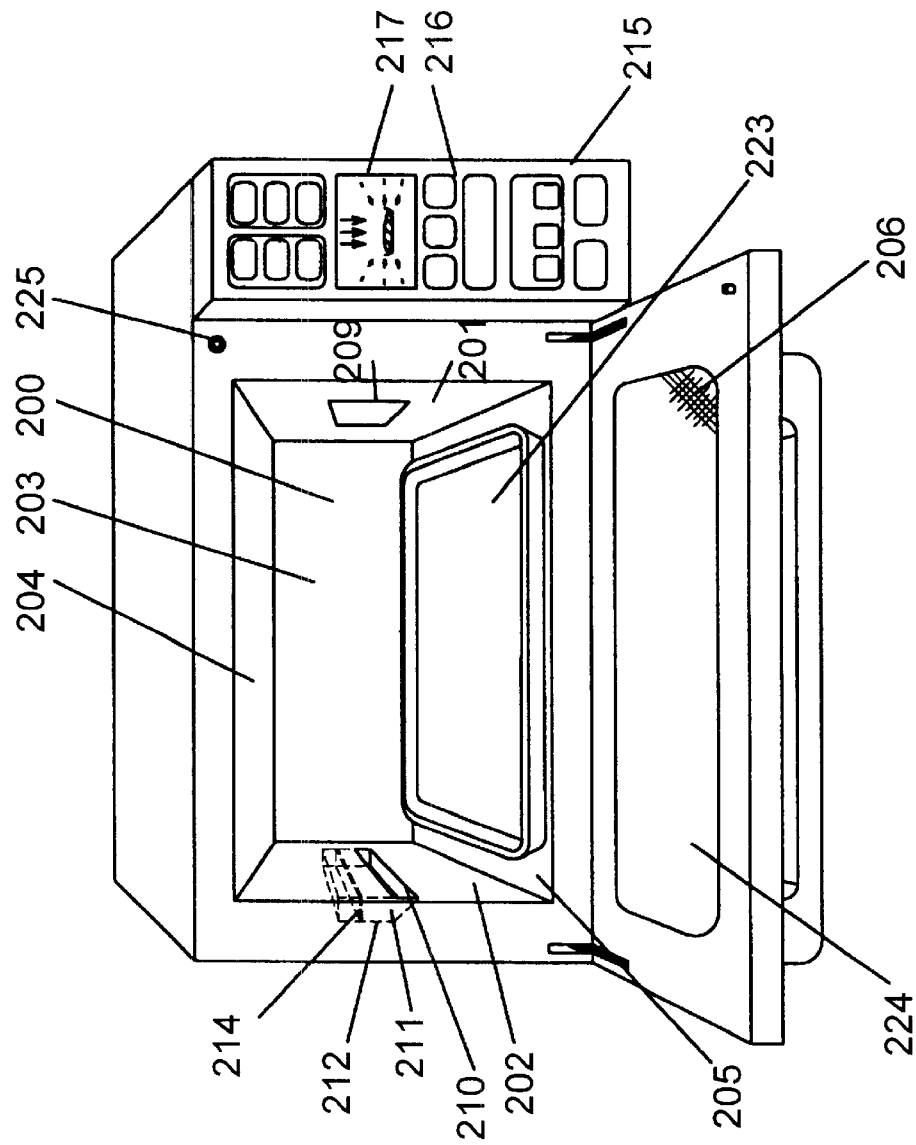
FIG. 13 shows an appearance of a high frequency heating appliance in accordance with a seventh exemplary embodiment of the present invention.
Figure 14:
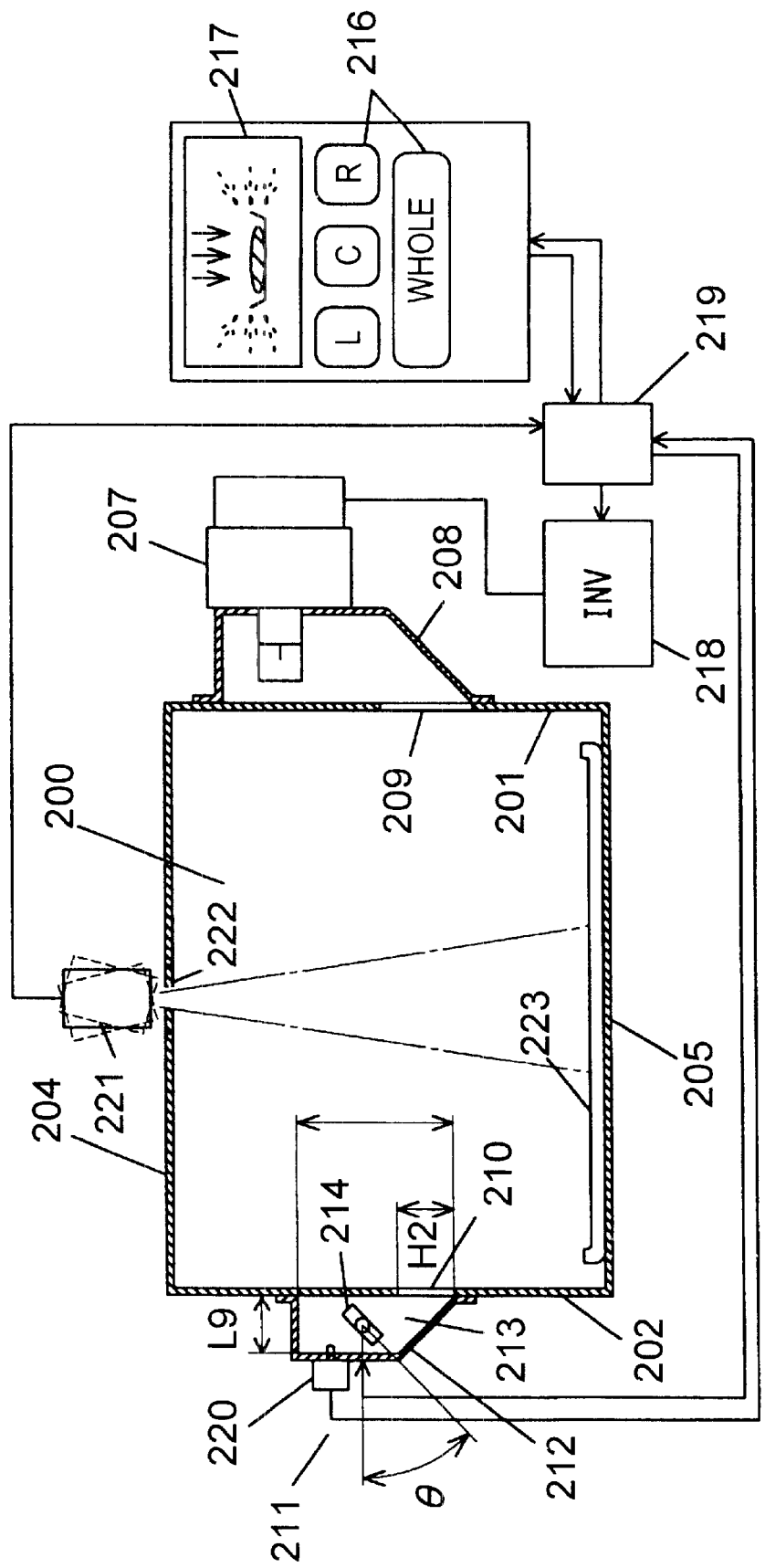
FIG. 14 is a cross section of an essential part of FIG. 13.

FIG. 13 shows an appearance of the high-frequency-heating appliance in accordance with the seventh embodiment. FIG. 14 shows a cross section of an essential part of FIG. 13.

In FIG. 13 and FIG. 14, substantially rectangular microwave cavity 200 is formed by right wall 201, left wall 202, end wall 203, upper wall 204 and bottom wall 205 and front openable wall 206 through which an object is put in or out to/from cavity 200. These walls are made of metallic material, and entrap microwave fed therein. Magnetron 207 is a high-frequency-wave generator and feeds power to cavity 200. Waveguide 208 transmits the microwave generated by magnetron 207 into microwave cavity 200. microwave outlet 209 radiates the microwave generated by magnetron 207 to cavity 200 and couples cavity 200 with waveguide 208 so that the microwave travels therethrough.

Opening 210 is provided on left wall 202 in rectangular shape. Impedance varying unit 211 is formed continuously with opening 210, and provided outside cavity 200. Impedance varying unit 211 comprises dielectric plate 214, a movable body, in waveguide section 213 formed by left wall 202 and metal-made grooving plate 212 covering opening 210. Waveguide section 213 has given length L8 (not shown) and groove depth L9 approx. equal to opening dimension H2 of opening 210. The terminal end of waveguide section 213 actually closes the microwave by grooving plate 212. Dielectric plate 214 constituting impedance varying unit 211 is driven to rotate and has means for being driven to rotate (not shown).

Operation panel 215 is provided on a front face of the appliance. In operation panel 215, heating area selector 216 for selecting a heating area of an object to be heated, and display 217 for displaying the flow of microwave to the object are disposed. These two elements will be detailed later.

Inverter driving power supply 218 drives magnetron 207. Controller 219 controls operations of the entire appliance. Microwave detector 220 inputs a signal coupled with the microwave at waveguide section 213 into controller 219. Infrared temperature detector 221 detects a temperature of the object through hole 222 provided on upper wall 204, and sends an obtained signal into controller 219. Controller 219 controls the operation of inverter driving power supply 218 and the operation of rotary driver which drives dielectric plate 214 based on the information from operation panel 215 and the signals from microwave detector 220 as well as infrared temperature detector 221. As a result, the appliance can heat the object with microwave at an optimum condition.

The object is placed on table 223. Transparent window 224 is disposed at approx. center of front openable wall 206 and equipped with punched holes through which a user can see inside of microwave cavity 200. Door-latch-switch 225 judges whether or not front wall 206 is closed completely.

Figure 15:
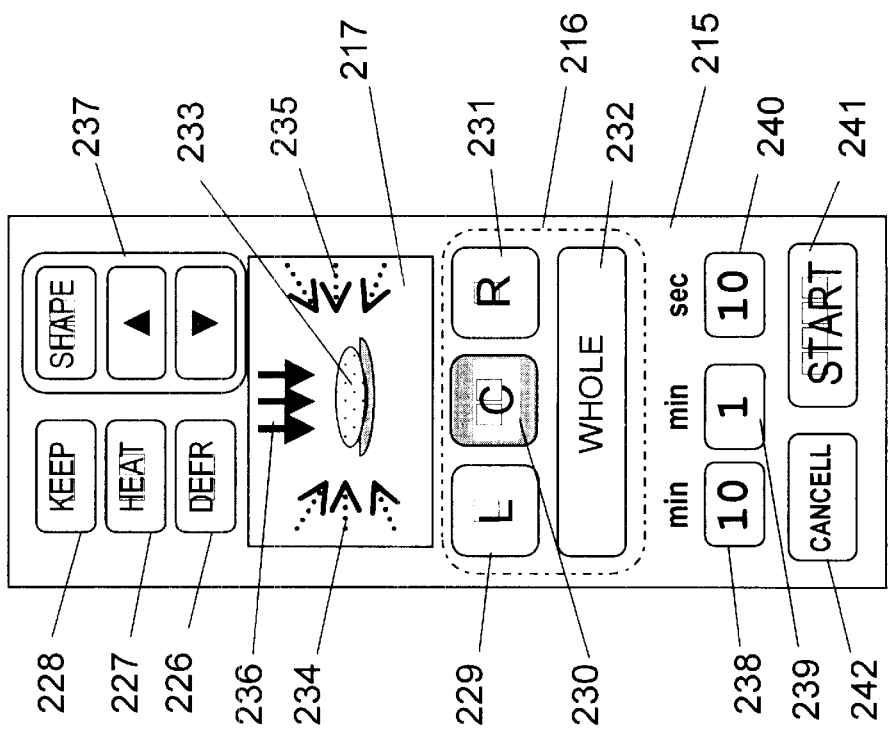
FIG. 15 is an enlarged view of a operation panel shown in FIG. 13.

FIG. 15 is an enlarged view of the operation panel shown in FIG. 13. FIG. 16A–FIG. 16D show displays following the control instructed through the essential part (operation panel) shown in FIG. 15. The featuring structures of the present invention are described using these drawings. On operation panel 215, various items to be input are arranged for users to select for heating and cooking the object. These items are selectable items relating to methods of heating the object. They are "defrost" key 226, "heat" key 227 for re-heating the object, and "keep warm" key 228. These input keys can automatically control dielectric heating to the object. Based on each input information, controller 219 controls the impedance-varying-unit according to given details of control.

Figure 16:
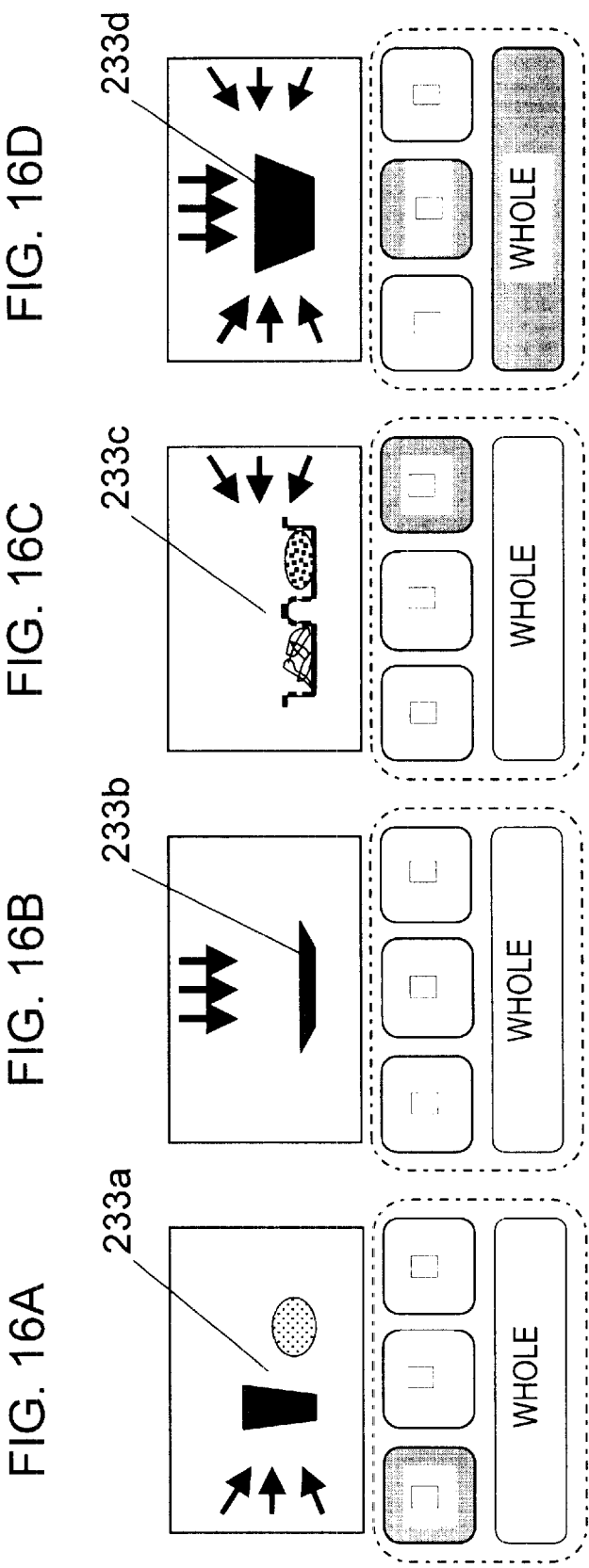
FIG. 16A–FIG. 16D show displays corresponding to respective operations of operation panel shown in FIG. 15.

On the other hand, heat-area-selector 216 for selecting an area on the object and display 217 for displaying a flow of microwave to the object are placed in operation panel 215 as input keys for executing an intention of a user about dielectric heating to the object. Heat area selector 216 comprises four instruction keys, namely, "left" key 229 for heating a left part of the object viewed from the front of the appliance, "center" key 230 for heating a center part, "right" key 231 for heating a right part, and "whole" key 232 for heating the whole object. Picture 233 of the object is placed at the center of display 217, and arrow marks indicate transmission of microwave to the object. To be more specific, arrow marks 234–236 show the microwave transmission from both sides and from upper section. Displays shown in FIG. 13–FIG. 15 indicate that "center" is selected and downward arrow marks 236 are displayed for showing the microwave transmission. Broken-arrow-marks 234, 235 on both sides are only for an explanation of displayed content and are not displayed in actual operation as shown in FIG. 16. Pictures 233a–233d placed at the center of display 217 are changed responsive to respective heat instructions as shown in FIG. 16, and increase the convenience for a user to recognize visually his/her desired heating mode.

To be more specific, in FIG. 16A, picture 233a indicates a cup of coffee and a hamburger are to be heated, and it also indicates that the coffee is to be more intensely heated than the hamburger. FIG. 16B shows that picture 233b indicates food on a small and flat container is to be heated. It also indicates that the microwave is concentrated to the area the food is kept. FIG. 16C shows that picture 233c indicates a plurality of foods on different plates is to be heated, and it also indicates that a hamburger on the right is to be more intensely heated than vegetable on the left. FIG. 16D shows that picture 233d indicates volume of the object is to be heated, and it also indicates that the microwave is dispersed over entire object. The pictures explained above can be changed by depressing shape-selector 237.

Rotating angle of dielectric plate 214 with respect to each heat instruction is specified as follows: "left": angle 0 (zero) degree, "center": angle 45 degree, "right": angle 90 degree, and "whole": continuous rotation at a given speed.

Since the flow of microwave in the cavity is displayed, the user can visually recognize the selected heat instruction with ease, and also the user can identify the matching of the heated status with the selected instruction. These mechanisms increase the convenience of the appliance for the users.

Figure 17:
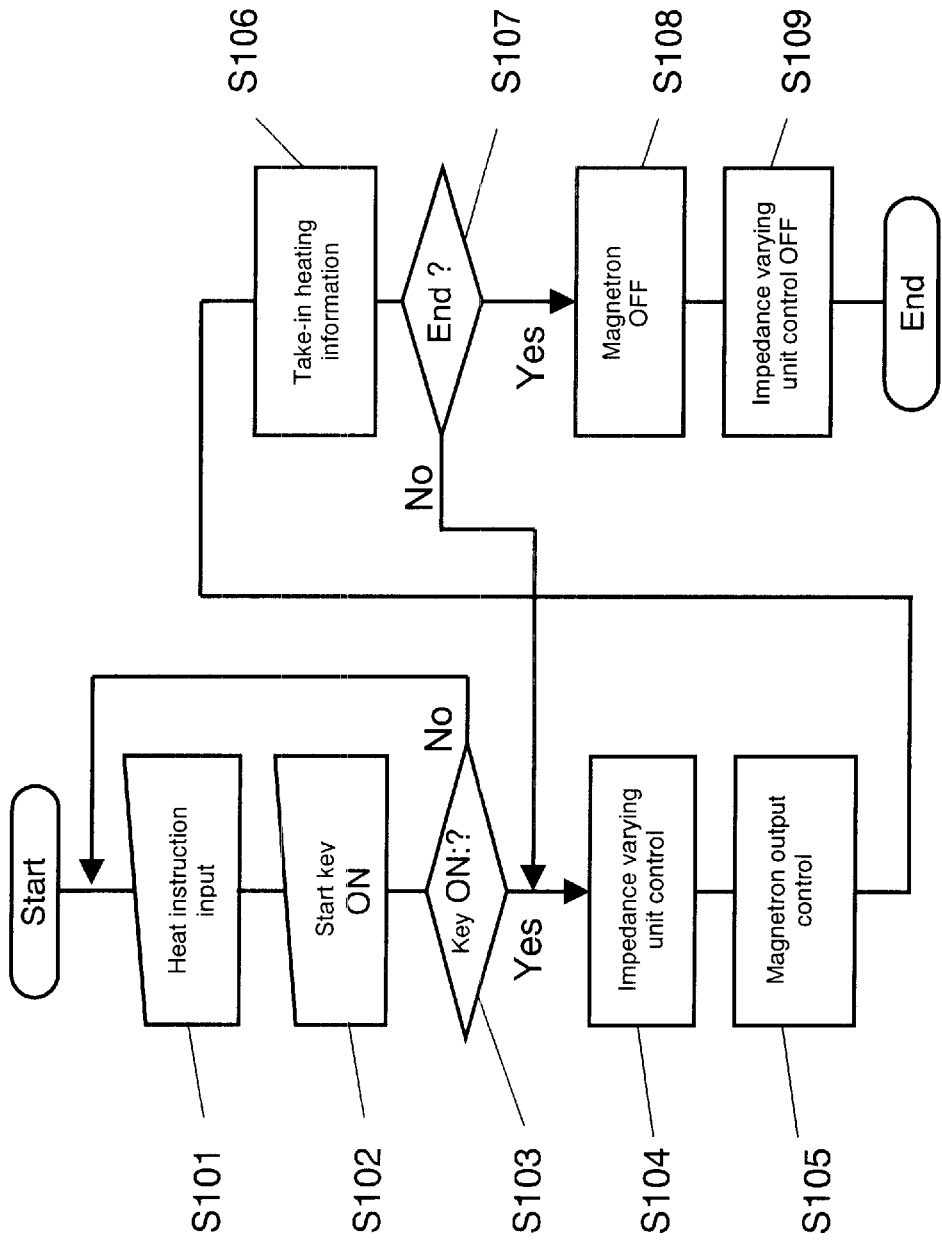
FIG. 17 is a flowchart illustrating details of control in the high frequency heating appliance shown in FIG. 13.

Next, operation procedure and details of control of the high-frequency-heating appliance explained above are demonstrated with reference to FIG. 17. After the object is placed in the microwave cavity, a user determines an area to be heated on the object and select one of the heat instruction (S101). Then the user inputs a heating time (with keys 238–240 shown in FIG. 15), and depresses "start" key 241 (S102), which starts dielectric heating on the object. Key input judgement (S103) confirms that "start" key 241 is surely depressed. If "cancel" key 242 is depressed before "start" key is depressed, then the procedure returns to S101.

Controller 219 operates the stepping motor that functions as a driver of dielectric plate 214, so that the dielectric plate 214 is set at a desirable rotating angle or rotated continuously. When plate 214 is set at a desirable rotating angle, plate 214 is rotated in stepping manner, and a position of rotating angle of □45 degree (315 degree), where a signal of microwave detector 220 is maximized, is detected, then the dielectric plate is set at the desirable rotating angle (S104). Next, inverter-driving-power-supply 218 starts its operation so that magnetron 207 generates microwave (S105).

Heating process of the object is monitored by taking-in the heating information (S106), and when heat-end judgement (S107) turns "Yes", the heating is judged to end. Then inverter driving power supply 218 stops operation, and magnetron 207 is powered off (S108). After that, the stepping motor, which controls dielectric plate 214, is powered off to complete the microwave heating of the object (S109).

Regarding the monitoring of the heating process and the end judgement based on the monitoring in S106 and S107, these process are performed in such a way that information at every moment is checked or compared to an end-judgement-reference based on heating-time-information supplied from operation panel 215, signals detected by microwave detector 220 or signals detected by infrared temperature detector 221.

The heating information is not limited to the ones explained above, but it can be sensor-information of such as gas or vapor generated from the object.

Next, an example of measuring the heating distribution by the high-frequency-heating appliance in accordance with this embodiment is described. The microwave cavity has dimensions of width=310 mm, depth=310 mm, and height=215 mm, and has an excitation mode of <3 3 2>. "Adhere synthetic glue" paste (13.7–14% aqueous solution of polyvinyl alcohol) made by Sekisui Chemical Inc. is used as a heating load. This paste is colorless in the temperature range of 0–45° C., and becomes cloudy over 45° C.

Figure 18:
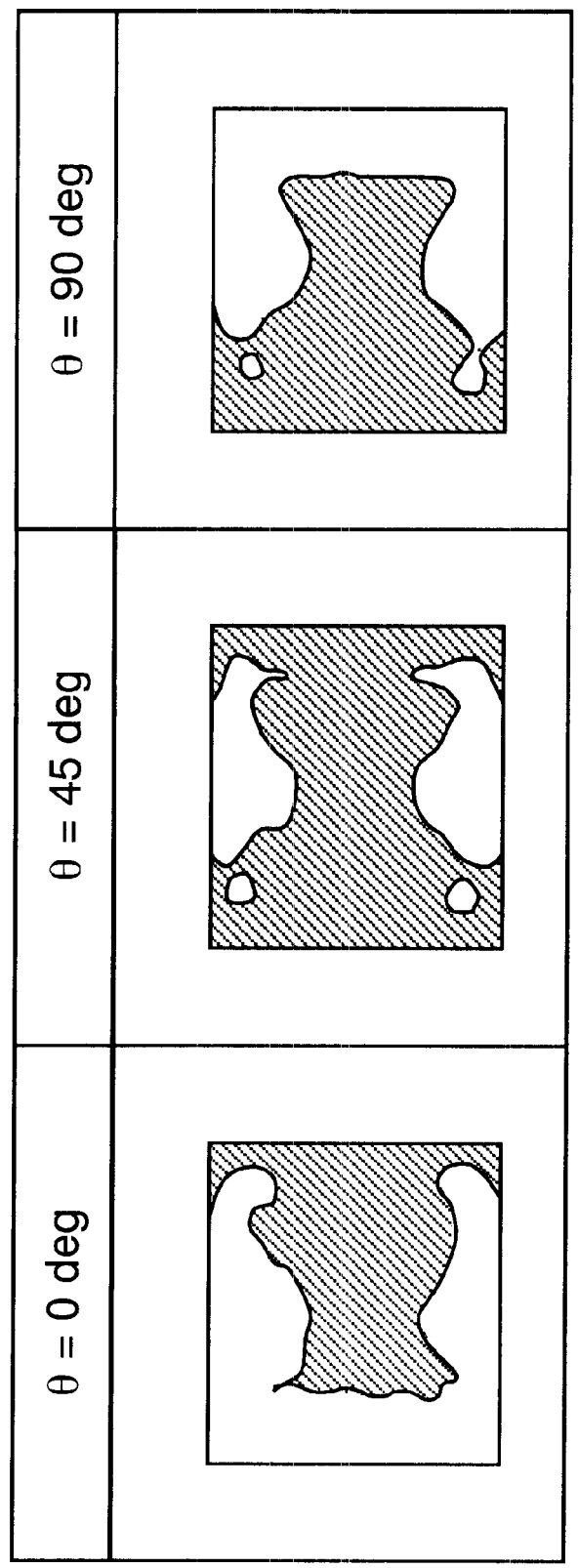
FIG. 18 shows heat distribution when a pseudo load is heated in the high frequency heating appliance shown in FIG. 13.

FIG. 18 shows heating distribution using 200 g of the paste. The container of the paste has a bottom area of 100 mm$^2$.

The heating distribution is based on 500 W microwave and heating for 40 seconds. In FIG. 18, white area represents a heated area. Varying a rotating angle of dielectric plate 214 can change the white area, i.e., the heated area. The rotating angle of plate 214 for selecting the heating area placed in operation panel 215 corresponds to respective keys as follow: 0 (zero) degree: "left" key 229, 45 degree: "center" key 230, 90 degree: "right" key 231.

As such, heating instructions of "center" for heating central area of an object, "left" and "right" for heating peripheral area are provided, so that a user can specify a heating area on various shapes and dish-up styles of an object arbitrarily. As a result, an optimum heating or user's favorable heating can be carried out responsive to an object. Such a high-frequency-heating appliance can be provided.

As it is well known, the "Adhere synthetic glue" paste has a greater dielectric loss and shorter permeable depth than water. In the case of heating instruction "center" when the paste is used as a load, FIG. 18 shows insufficient heating to the central part; however, when a regular food is used, the "center" instruction can perform an excellent job.

Details of controller 219 is described with reference to FIG. 19–FIG. 22.

Figure 19:
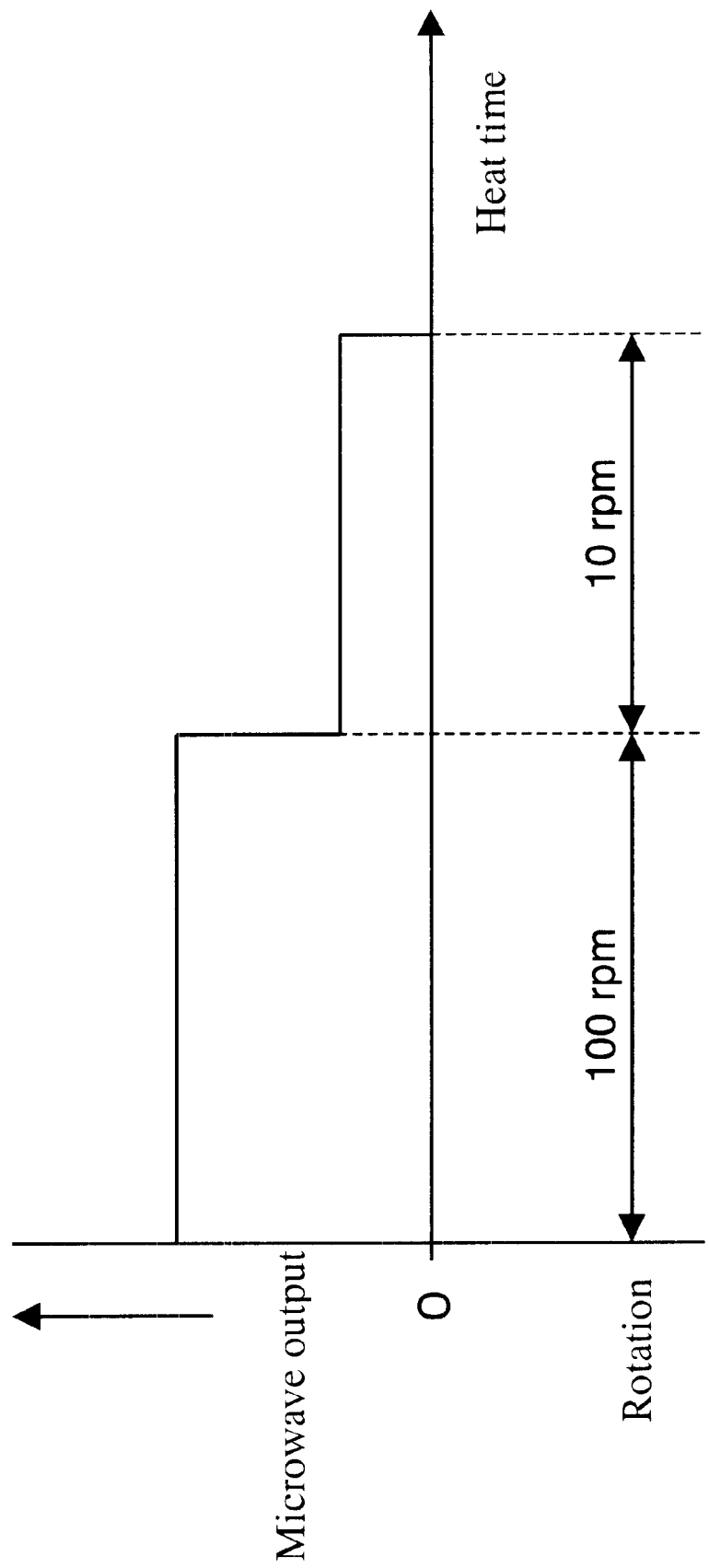
FIG. 19 shows details of a first control of the high frequency heating appliance shown in FIG. 13.

FIG. 19 shows an example of heating instruction "whole". Controller 219 controls an output from magnetron 207 and rotating speed of dielectric plate 214 of the impedance varying unit. In other words, controller 219 controls the rotating speed of dielectric plate 214 interlocking with the output of the microwave, thereby dispersing the microwave into the entire cavity. In the case of large microwave output, dielectric plate 214 is rotated at 100 rotations per minute, and in the case of small output, plate 214 is rotated at 10 rotations per minute. The switch timing of these operations is controlled with heating information gained from the object or a signal detected by the microwave detector.

Figure 20:
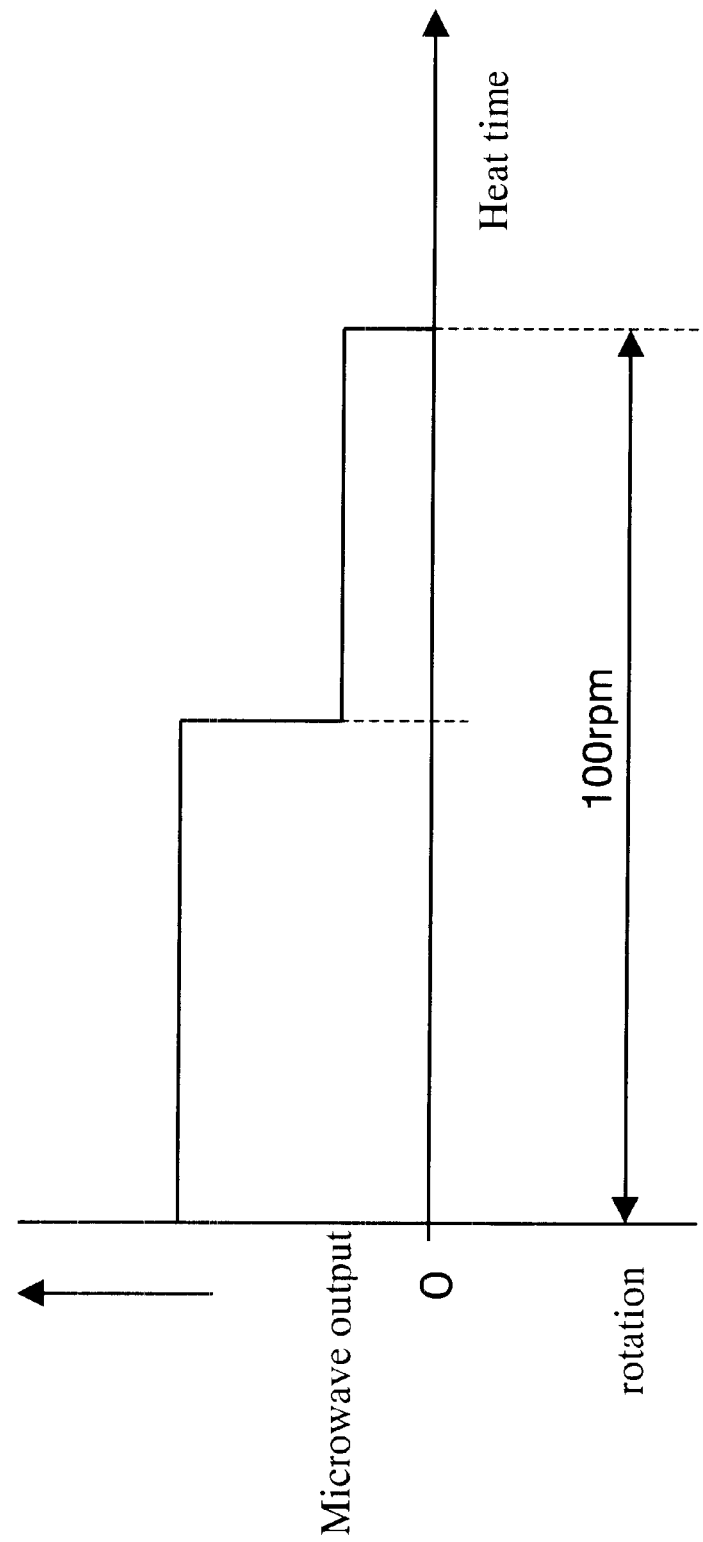
FIG. 20 shows details of a second control of the high frequency heating appliance shown in FIG. 13.

FIG. 20 shows a cooking example of "defrost". Controller 219 rotates dielectric plate 214 at a constant speed of 100 rotations per minute, and varies the standing-wave-distribution constantly in great amount, thereby avoiding a local heating. The microwave is supplied in greater amount firstly, and in small amount later.

Figure 21:
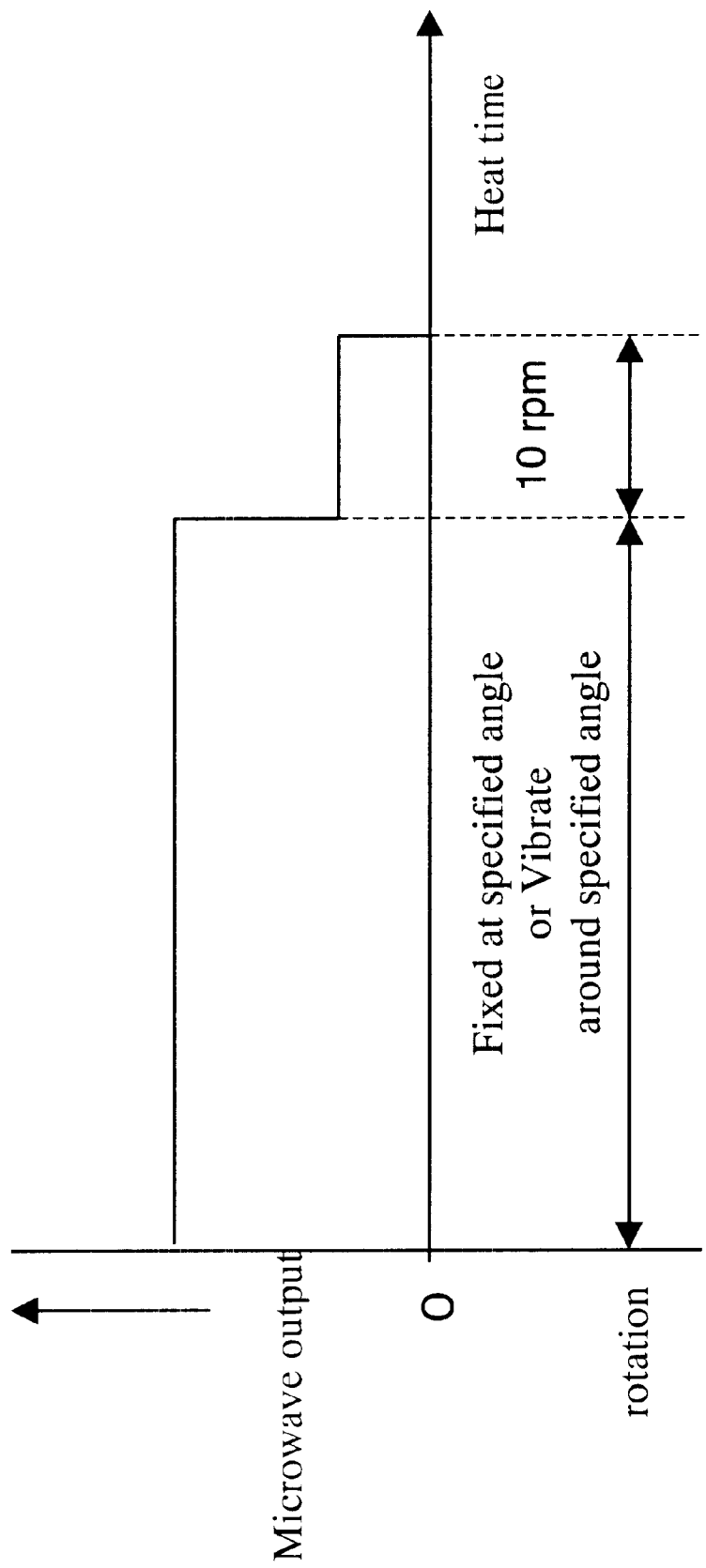
FIG. 21 shows details of a third control of the high frequency heating appliance shown in FIG. 13.

FIG. 21 shows an example of heating control based on user's intention. Controller 219 sets dielectric plate 214 at an angle corresponding to the selected heating area. Regarding this specifying of the angle, the rotating angle is vibrated back and forth at the center of the specified rotating angle, so that an object has some tolerance at its positioning, which increases convenience for users.

Figure 22:
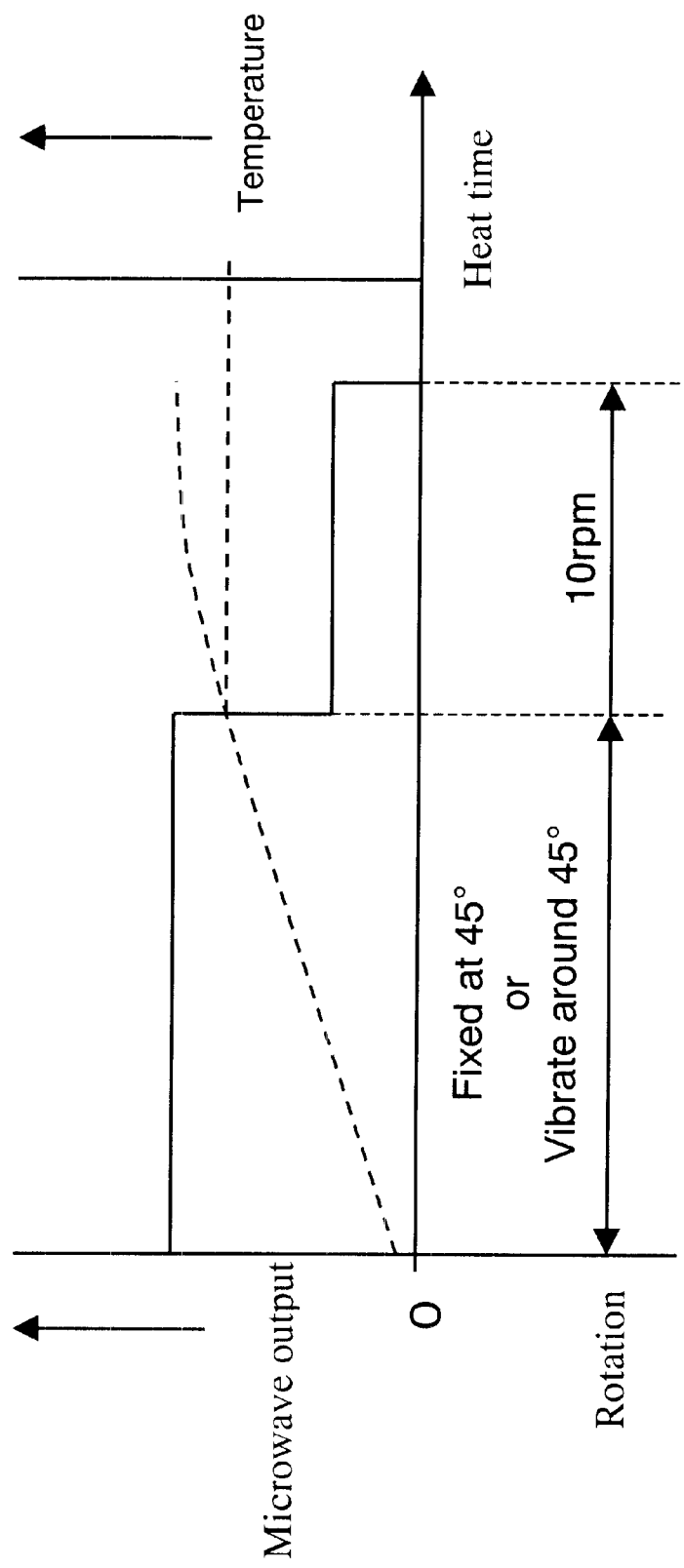
FIG. 22 shows details of a fourth control of the high frequency heating appliance shown in FIG. 13.

FIG. 22 shows an example of automatic heating based on temperature information obtained at "center" heating instruction. When the object reaches a given temperature, the output of microwave lowers, and dielectric plate 214 is switched to 10 rotations per minute for finalizing the heating.

Eighth Exemplary Embodiment

A high-frequency-heating appliance in accordance with the eighth exemplary embodiment of the present invention is explained hereinafter. The eighth embodiment differs from the seventh embodiment in a structure where a turntable on which an object is placed is added.

Figure 23:
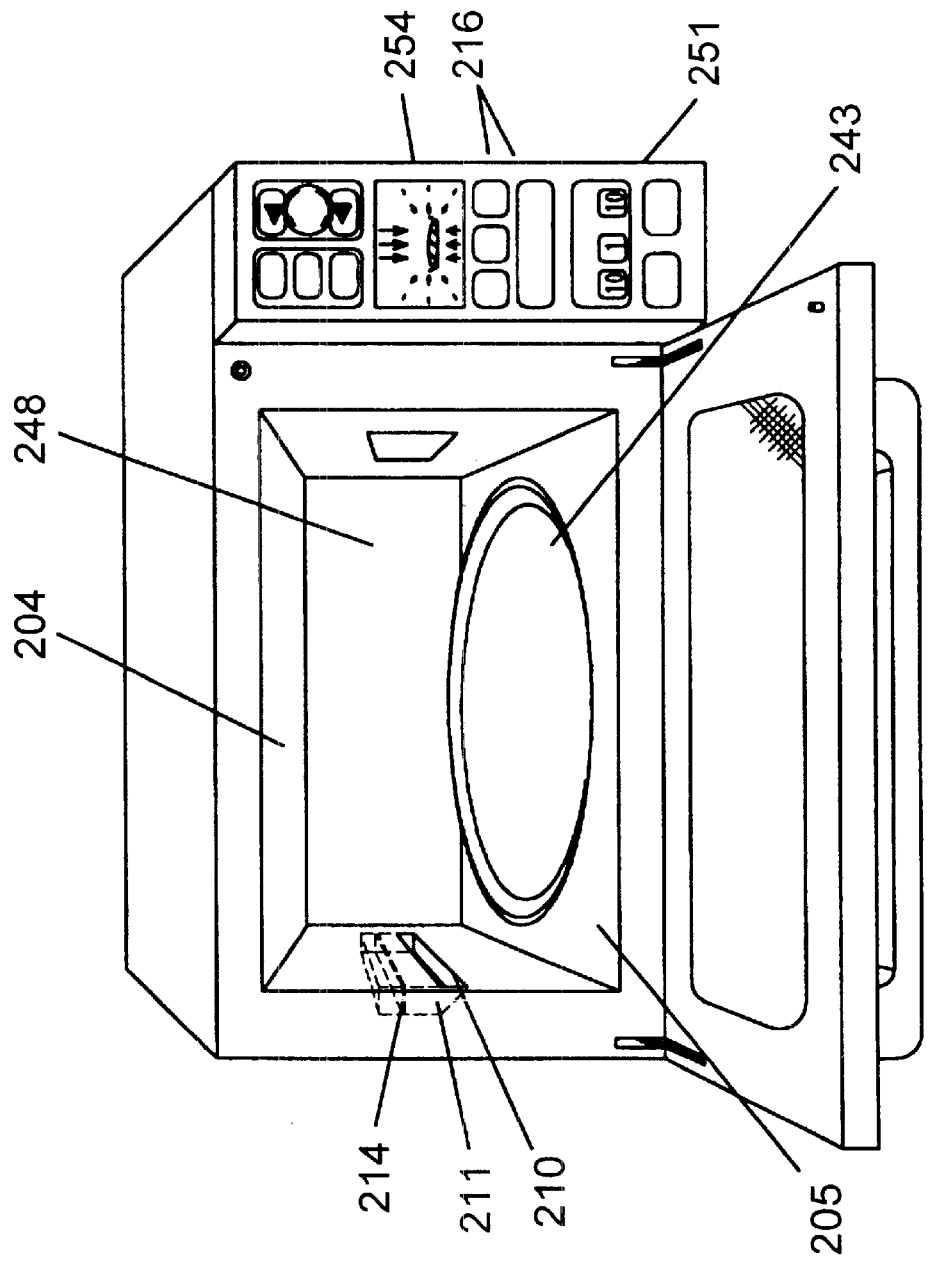
FIG. 23 shows an appearance of a high frequency heating appliance in accordance with a eighth exemplary embodiment of the present invention.
Figure 24:
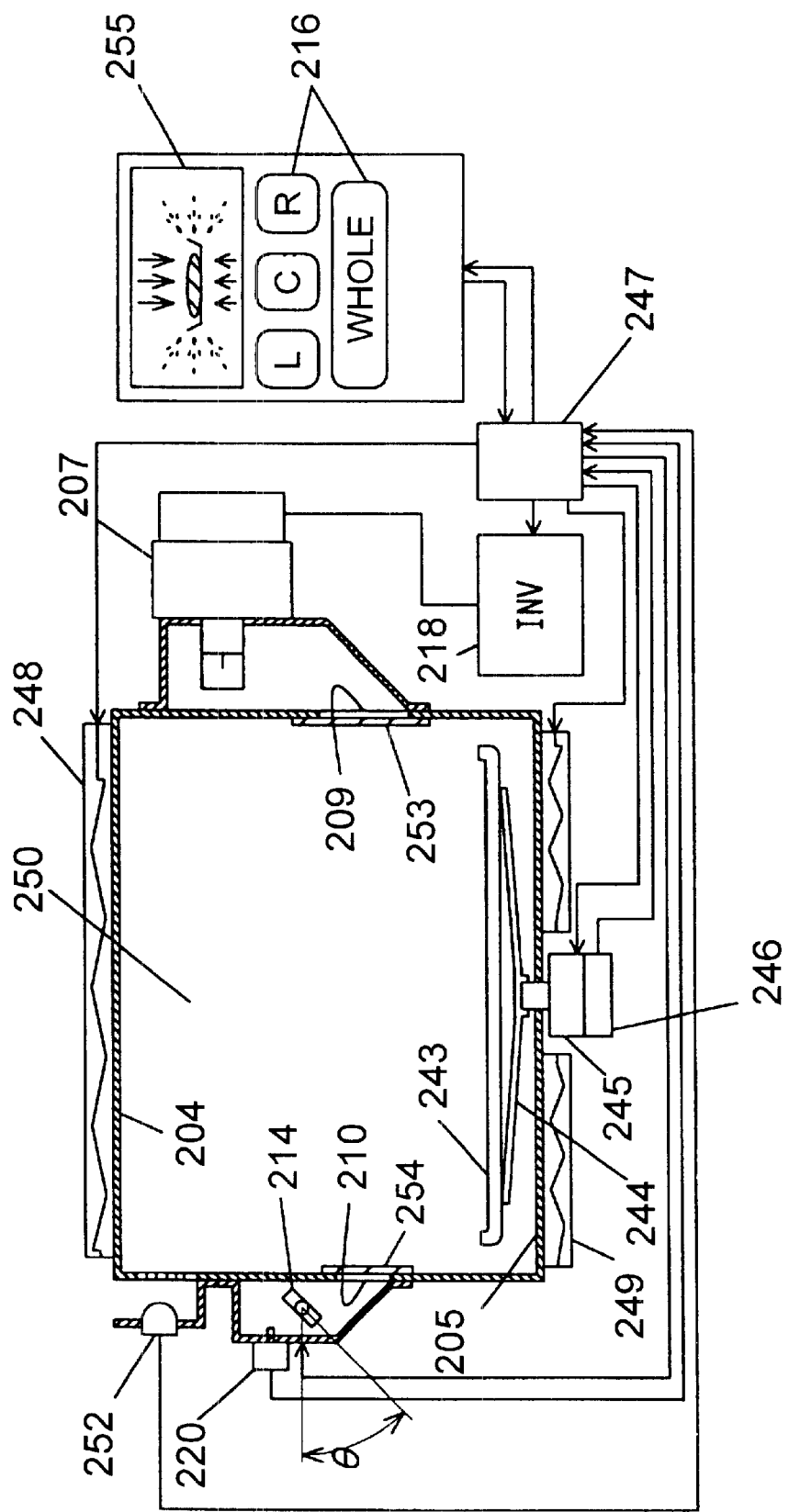
FIG. 24 is a cross section of an essential part of FIG. 23.
Figure 25:
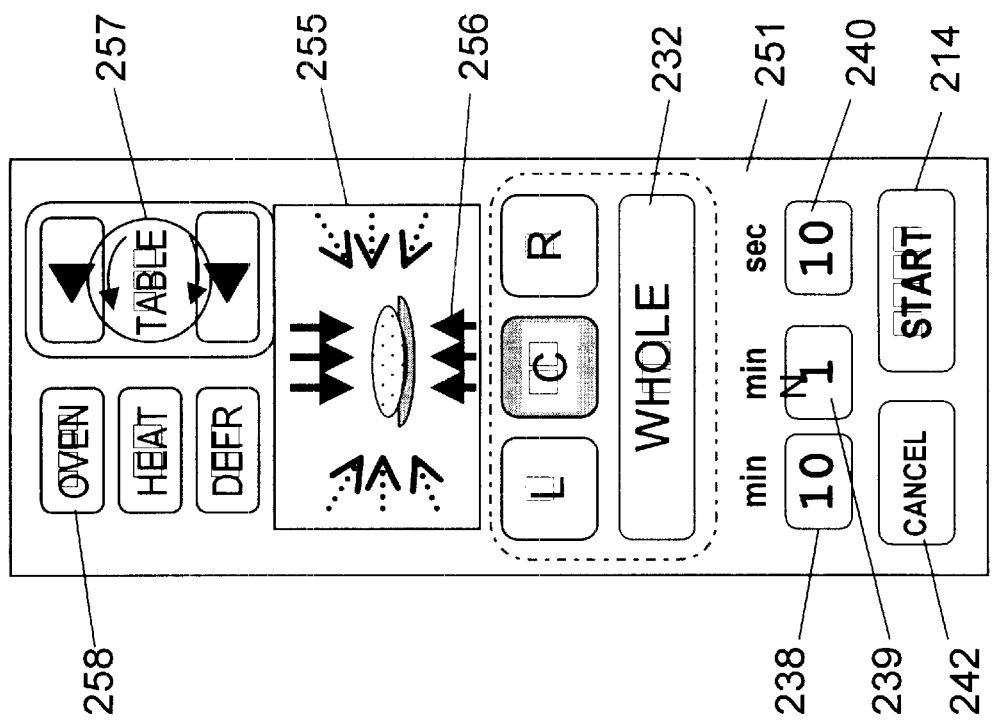
FIG. 25 is an enlarged part of a operation panel shown in FIG. 23.
Figure 26:
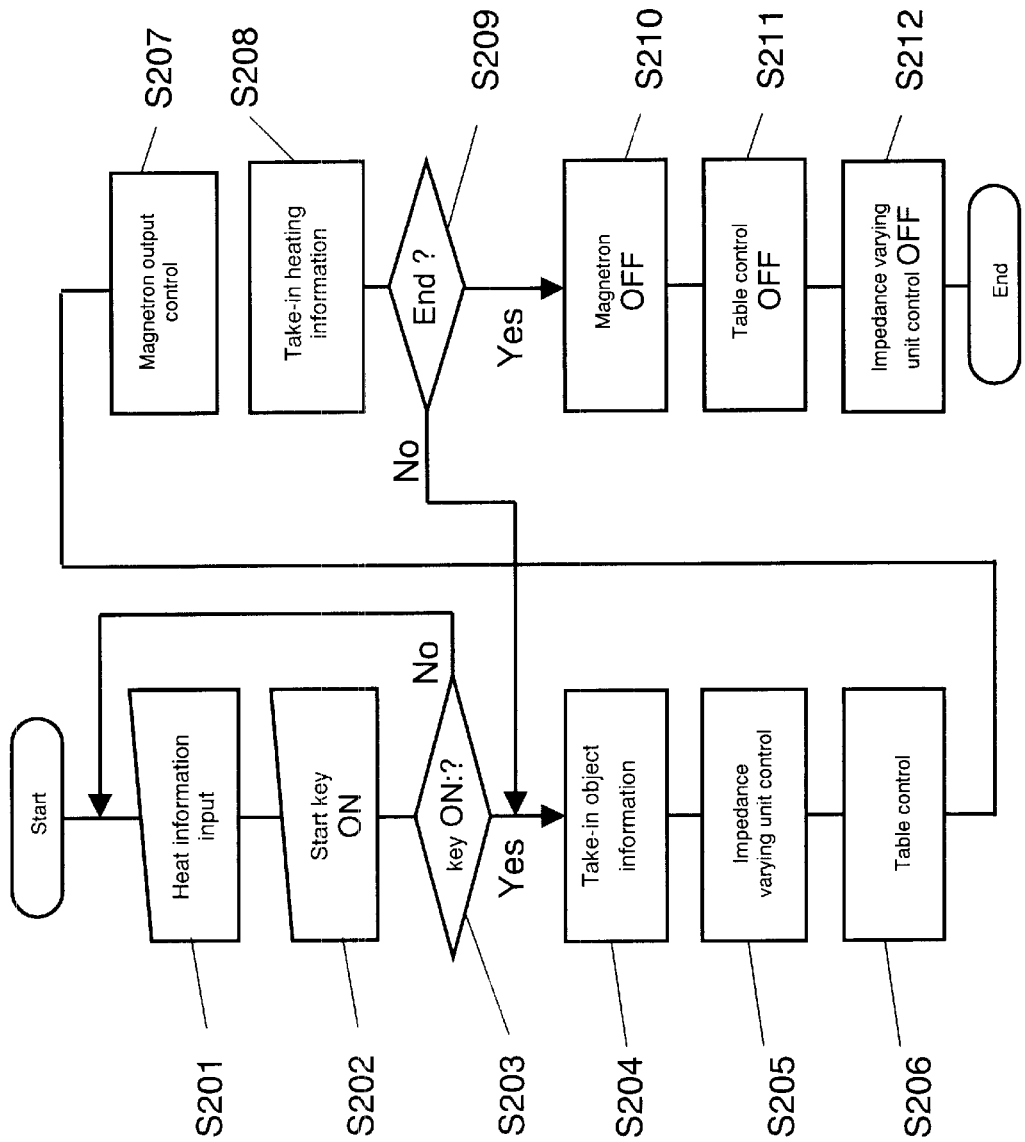
FIG. 26 is a flowchart illustrating details of control in the high frequency heating appliance shown in FIG. 23.

FIG. 23 shows an appearance of the appliance used in this embodiment, FIG. 24 is a cross section of an essential part shown in FIG. 23. FIG. 25 is an enlarged view of an operation panel shown in FIG. 23. FIG. 26 is a flowchart illustrating the details of control shown in FIG. 23.

In those Figs., the members and the elements having the same function as those in the seventh exemplary embodiment bear the same reference marks as those in the seventh embodiment, thus the descriptions thereof are omitted here.

In FIGS. 23, 24, the object is placed on table 243. Supporter 244 supports table 243. A motor functioning as a table driver 245 rotates table 243 via supporter 244. Weight detector 246 detects via supporter 244 a weight of the object placed on table 243, and inputs a detection signal to controller 247. Flat heaters 248, 249 are coupled with upper wall 204 and bottom wall 205 of microwave cavity 250 respectively. Heating information is input through operation panel 251. Gas detector 252 detects an amount of vapor generated from the object. Microwave outlet 209 and opening 210 are covered by heatproof plates 253, 254 made of inorganic material.

Operation panel 251 shown in FIG. 25 differs from that of the seventh embodiment in the following three points:

(a) upward-microwave-flow 256 to the object is added to display 255;

(b) operation key 257 to manually control the rotation of table 243 is provided; and (c) input key 258 for oven heating is added.

An operational procedure and details of control of the high-frequency-heating appliance explained above are demonstrated with reference to FIG. 26. Placing the object in the microwave cavity, a user determines a heating area on the object, and selects one of the heating items explained above (S201). Then a heating time is input (designate the time with keys 238–240 in FIG. 25), and "start" key 241 is depressed (S202), so that dielectric heating to the object starts. Key-input-judgement (S203) confirms that "start" key 241 is surely depressed, and if "cancel" key 242 is depressed before "start" key 241 is depressed, the process returns to S201.

Just after the heating starts, controller 247 takes in a signal detected by weight detector 246, then operates the stepping motor that functions as a driver of dielectric plate 214 based on heating information and the weight signal supplied from operation panel 251, so that the dielectric plate 214 is set at a desirable rotating angle or rotated continuously. When plate 214 is set at a desirable rotating angle, plate 214 is rotated in a stepping manner, and after a position of rotating angle of □45 degrees (315 degree), where a signal of microwave detector 220 is maximized, is detected, then the dielectric plate is set at the desirable rotating angle (S205). After that, controller 247 sends a control signal to table driver 245 thereby controlling an action of the table driver (S206). Then, controller 247 activates inverter-driving-power-supply 218 so that magnetron 207 generates microwave (S207).

Heating process of the object is monitored (S208), and when heat-end judgement (S209) turns "Yes", the heating is judged to be ended. Then inverter driving power supply 218 stops operation, and magnetron 207 is powered off (S210). After that, the table driver stops controlling the table and the table stops (S211). The stepping motor, which controls dielectric plate 214, is powered off to complete the microwave heating to the object (S212).

Regarding the monitoring of the heating process and the end judgement based on the monitoring in S209 and S208, these process are performed in such a way that information at every moment is checked or compared to an end-judgement-reference based on heating-time-information supplied from operation panel 215, signals detected by microwave detector 220 or signals detected by gas detector 252.

The heating information is not limited to the ones explained above, but it can be e.g. temperature-information of the object as described in the seventh embodiment.

Next, the heating distribution of the high-frequency-heating appliance, having a function of rotating the object, in accordance with this eighth embodiment is demonstrated hereinafter. Microwave cavity 250 has dimensions of width= 300 mm, depth=320 mm, and height=215 mm, and has excitation modes of <3 3 2>, <4 1 2>. Opening 210 is provided so that high-frequency-current inducted onto metal wall corresponding to the excitation mode <3 3 2> is broken. Table 243 is placed by 27 mm high above the bottom wall of cavity 250. "Adhere synthetic glue" paste is used as a heating load.

Figure 27:
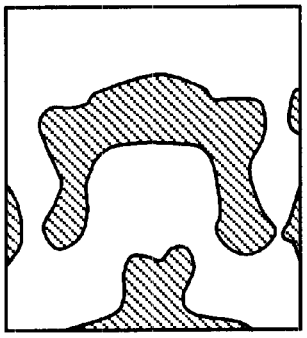
FIG. 27 shows heat distribution when a pseudo load is heated in the high frequency heating appliance shown in FIG. 23.

FIG. 27 shows heating distribution when 200 g of the paste is heated. The container of the paste has a bottom area of 100 mm$^2$.

The heating distribution is based on 500 W microwave and heating for 60 seconds. In FIG. 27, white area represents a heated area. The "whole" key 232 is selected and dielectric plate 214 is rotated at 15 rotations per minute. FIG. 27(*a*) shows a case when table 243 is stopped, and FIG. 27(*b*) shows a case when table 243 is rotated at 6 rotations per minute.

In microwave cavity 250 of the eighth embodiment, when the impedance of opening 210 increases, the excitation mode <3 3 2> is deformed and another excitation mode <4 1 2> becomes strong. In this <4 1 2> mode, the microwave is concentrated to the center of the table.

Dielectric plate 214 is solely rotated continuously, so that mode <3 3 2>, <3 3 2> and <4 1 2>, <4 1 2> are deformed respectively, and all the excitation modes are deformed in microwave cavity 250, thus creating a heating condition shown in FIG. 27(*a*). On the other hand, if the rotation of table 243 is superimposed to the continuous rotation of dielectric plate 214, entire periphery of the object can be heated as shown in FIG. 27(*b*).

As such, dielectric plate 214, being supported at a given angle or rotated continuously, is combined with the table being stopped from rotating or rotated continuously, so that the object can be heated concentrically or in only peripheral area, moreover, it is promoted that the entire object is uniformly heated. As a result, the high-frequency-heating appliance, enhancing the convenience for users, can be provided.

In the appliance having the table driver, when a control method such as halting the table and rotating only dielectric element continuously is carried out, the center section of the object can be heated as intense as the peripheral area thereof. Accordingly, this method is effective to the foods, having a smaller permeate depth of microwave, such as hamburger, stew, and steamed food in a cup.

Figure 28:
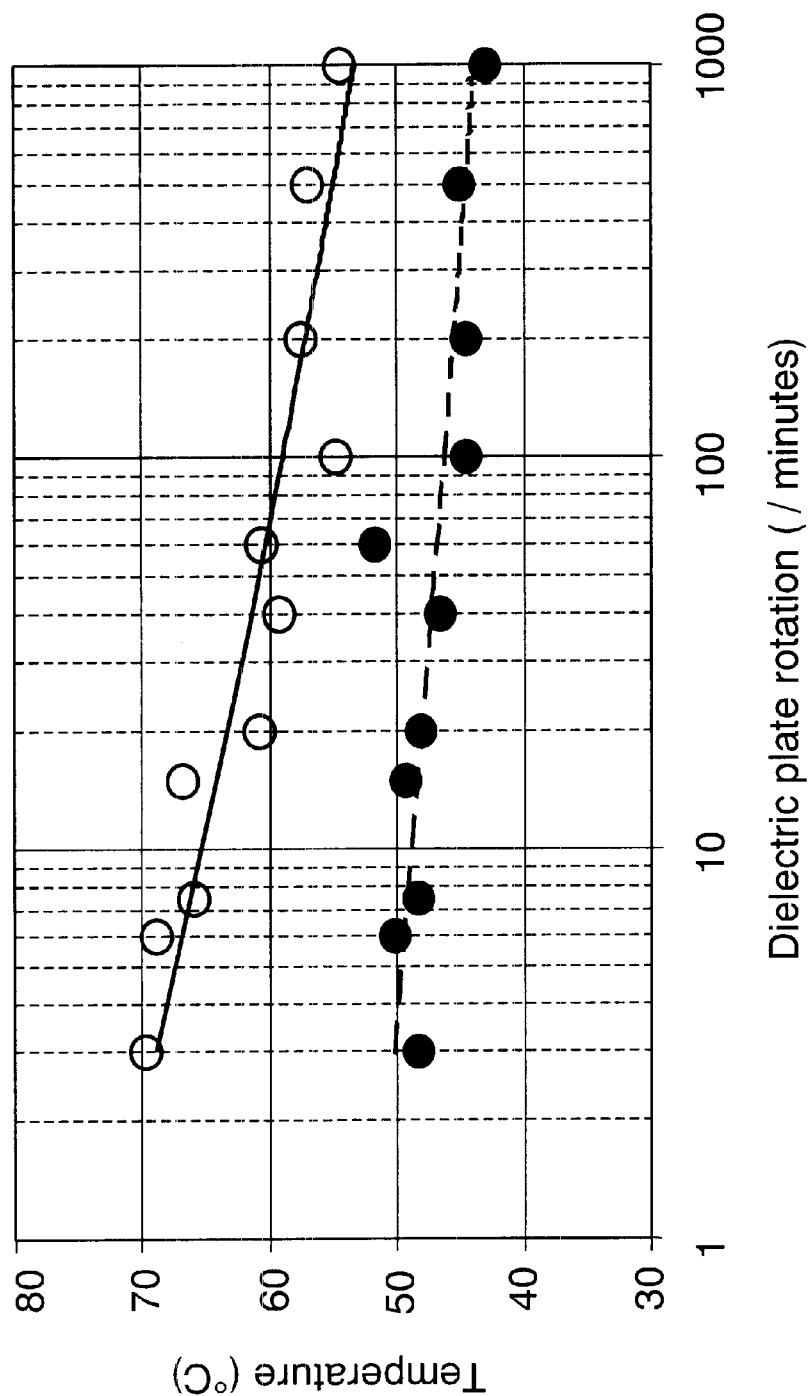
FIG. 28 shows characteristics of water load with respect to variable speeds of the impedance varying unit in the high frequency heating appliance shown in FIG. 23.

Regarding the control method of superimposing the rotation of table 243, a more effective method is demonstrated hereinafter. FIG. 28 shows a temperature difference in vertical direction of the water of 200 cc. The water of 200 cc has been heated by 500 W of microwave for 90 seconds in a cylindrical container having 72 mm diameter like a mug. This water was at an initial temperature of 7±2° C., and the rotating speed of dielectric plate 214 is used as a parameter.

According to the characteristics shown in FIG. 28, uniform heating is further accelerated at higher rotating speed of dielectric plate 214. As such, the control method of plate 214 at a high speed can accelerate the dispersion of the microwave in vertical direction within the microwave cavity. Thus this method is effective for the food having rather higher height than a bottom area. To be more specific, the high-frequency-heating appliance having the characteristics explained above can optimally heat bottled milk, sake in a sake-warmer, and a mug of coffee.

INDUSTRIAL APPLICABILITY

In a microwave circuit such as a microwave transmission path or a microwave resonance, the impedance varying unit of the present invention works on the microwave from the main circuit via an opening provided on a wall forming a boundary of microwave transmission. Then the unit variably controls the transmission characteristics of the microwave. The unit is simply constructed and highly controllable. The unit is combined with the main circuit, so that a device using the unit has more tolerance for its assembly and for other components to be mounted thereto. When the unit is used in a cooking appliance, the appliance can select to heat an entire object or selected area of the object. As a result, variety of cooking is obtainable.

What is claimed is:

1. An impedance varying unit comprising:
    a waveguide section of a metallic material, and having a terminal end for reflecting microwaves and an open end for guiding microwaves;
    a movable body of a non-metallic material, rotatable on a rotational shaft defining a space to said terminal end in said waveguide section;
    a driver for driving said movable body; and
    a position detector in said waveguide section to detect an angular position of said movable body and thereby control the impedance of said reflected microwaves at said open end;
    wherein angular rotation of said movable body varies phase difference between incident microwaves at said open end and reflected microwaves at said open end, and thereby changing impedance between incident and reflected microwaves.

2. The impedance varying unit as defined in claim 1, wherein said movable body is driven by varying a space to a terminal end of said waveguide section.

3. The impedance varying unit as defined in claim 1, wherein a phase value of a voltage reflection coefficient at an open end of said waveguide section includes a value of ±180 degrees.

4. The impedance varying unit as defined in claim 1, wherein a phase value of a voltage reflection coefficient at an open end of said waveguide section includes a value of 0 (zero) degree.

5. The impedance varying unit as defined in claim 1, wherein an approx. center value of a variable range of a phase value of a voltage reflection coefficient at an open end of said waveguide section is ±180 degree.

6. The impedance varying unit as defined in claim 1 further comprising a position detector for detecting a position of said movable body.

7. The impedance varying unit as defined in claim 1 further comprising a microwave detector for detecting an intensity of electromagnetic field in said waveguide section.

8. The impedance varying unit as defined in claim 7, wherein one of a rotating angle and a position of said movable body is determined based on a signal from said microwave detector.

9. The impedance varying unit as defined in claim 1 wherein said driver comprises a stepping motor for driving said movable body.

10. The impedance varying unit as defined in claim 1, wherein said terminal end and said open end form approximately 90 degrees.

11. The impedance varying unit as defined in claim 1, wherein a plurality of said movable bodies are rotatably disposed in said waveguide section, and said movable bodies are independently controlled in rotational manner.

12. The impedance varying unit as defined in claim 1, wherein said waveguide section uses TEn0 (n: a positive interger) propagation mode.

13. A microwave device comprising:
    (a) a microwave cavity for substantially entrapping microwaves fed to said microwave cavity;
    (b) an opening provided at a place different from a microwave feeding place on a boundary wall forming said microwave cavity; and
    (c) an impedance varying unit including:
        a waveguide section of a metallic material, and having a terminal end for reflecting microwaves and an open end for guiding microwaves;
        a movable body of a non-metallic material, rotatable on a rotational shaft defining a space to said terminal end in said waveguide section;
        a driver for driving said movable body; and
        a position detector in said waveguide section to detect an angular position of said movable body and thereby control the impedance of said reflected microwaves at said open end;
        wherein angular rotation of said movable body varies phase difference between incident microwaves at said open end and reflected microwaves at said open end, and thereby changing impedance between incident and reflected microwaves.

14. The microwave device as defined in claim 13, wherein said opening is disposed so that a flow of a high-frequency-current flowing on a metal wall forming said microwave cavity is broken by the microwave fed.

15. A high frequency heating appliance comprising:
    (A) a microwave device including:
        (a) a microwave cavity for entrapping substantially microwave fed and for accommodating an object;
        (b) an opening provided on a place different from a microwave feeding place on a boundary wall forming said microwave cavity; and
        (c) a waveguide section made of metallic material, a first end of said waveguide section being terminated for reflecting microwave and a second end being opened for guiding microwave,
            a movable body made of non-metallic material, rotating on a rotational shaft defining a space to a terminal end in said waveguide section,
            a driver for driving said movable body; and
            a position detector in said waveguide section to detect an angular position of said movable body, and
        (d) an impedance varying unit, said impedance varying unit controls a rotating angle of said movable body for varying a phase difference between an incident wave of the microwave and a reflection wave thereof, so that an impedance at said opening is changed;
    (B) a high frequency generator and a feeding section for feeding microwave generated by said high frequency generator to the microwave cavity; and
    (C) a controller for controlling said impedance varying unit and said high frequency generator based on heating information of an object to be heated.

16. The high frequency heating appliance as defined in claim 15 further comprising a table on which the object is placed, and a table driver for rotating said table.

17. The high frequency heating appliance as defined in claim 15 or claim 16, wherein said microwave cavity is substantially a rectangle.

18. The high frequency heating appliance as defined in claim 17, wherein a plurality of said openings are disposed so that longitudinal axes of respective said openings run in different directions.

19. The high frequency heating appliance as defined in claim 15 or claim 16, wherein said opening is disposed so that a flow of a high-frequency-current traveling on a metal wall forming said microwave cavity is broken by the microwave fed.

20. The high frequency heating appliance as defined in claim 19, wherein a plurality of said openings are disposed so that longitudinal axes of respective said openings run in different directions.

21. The high frequency heating appliance as defined in claim 15 or claim 16, wherein a plurality of said openings are disposed so that longitudinal axes of respective said openings run in different directions.

22. The high frequency heating appliance as defined in claim 16, wherein said controller controls said impedance varying unit with halting said table driver based on the heating information of the object.

23. The high frequency heating appliance as defined in claim 15 or claim 16, wherein said controller controls a position of said movable body and an impedance variable speed of said impedance varying unit based on the heating information of the object.

24. The high frequency heating appliance as defined in claim 23, wherein the heating information is physical information obtainable from one of said appliance and the object during heating the object.

25. The high frequency heating appliance as defined in claim 15 or claim 16, wherein a user selectively inputs the heating information.

26. The high frequency heating appliance as defined in claim 25, wherein the information selectively input is one of defrost, re-heating, oven-cooking, and keep-warm.

27. The high frequency heating appliance as defined in claim 15 or claim 16, wherein the heating information is physical information obtainable from one of said appliance and the object during heating the object.

28. The high frequency heating appliance as defined in claim 27, wherein the physical information is an intensity signal of electromagnetic field within one of said microwave cavity and said impedance varying unit.

29. The high frequency heating appliance as defined in claim 27, wherein the heating information the user selectively inputs specifies a heating area in said microwave cavity.

* * * * *

UNITED STATES PATENT AND TRADEMARK OFFICE
CERTIFICATE OF CORRECTION

PATENT NO.      : 6,469,286 B1
DATED           : October 22, 2002
INVENTOR(S)     : Nobue et al.

It is certified that error appears in the above-identified patent and that said Letters Patent is hereby corrected as shown below:

<u>Column 19,</u>
Line 67, "interger" should read -- integer --.

Signed and Sealed this

Sixth Day of May, 2003

JAMES E. ROGAN
*Director of the United States Patent and Trademark Office*